(12) United States Patent
Oikawa

(10) Patent No.: US 12,243,571 B2
(45) Date of Patent: Mar. 4, 2025

(54) MAGNETIC RECORDING MEDIUM HAVING A CORE PART LEVEL DIFFERENCE

(71) Applicant: Sony Group Corporation, Tokyo (JP)

(72) Inventor: Sogo Oikawa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/284,215

(22) PCT Filed: Mar. 17, 2022

(86) PCT No.: PCT/JP2022/012167
§ 371 (c)(1),
(2) Date: Sep. 26, 2023

(87) PCT Pub. No.: WO2022/209935
PCT Pub. Date: Oct. 6, 2022

(65) Prior Publication Data
US 2024/0371405 A1    Nov. 7, 2024

(30) Foreign Application Priority Data

Mar. 31, 2021 (JP) ................. 2021-061963

(51) Int. Cl.
*G11B 5/78* (2006.01)
*G11B 5/008* (2006.01)
*G11B 5/706* (2006.01)
*G11B 23/107* (2006.01)

(52) U.S. Cl.
CPC ............ *G11B 5/78* (2013.01); *G11B 5/00813* (2013.01); *G11B 5/70642* (2013.01); *G11B 5/70678* (2013.01); *G11B 23/107* (2013.01); *G11B 2220/655* (2013.01)

(58) Field of Classification Search
None
See application file for complete search history.

(56) References Cited

U.S. PATENT DOCUMENTS

| | | | |
|---|---|---|---|
| 6,391,423 B1 | 5/2002 | Sato et al. | |
| 10,665,259 B1 * | 5/2020 | Yamaga et al. | ......... G11B 5/78 |
| 2003/0215672 A1 | 11/2003 | Shoda et al. | |
| 2011/0109994 A1 | 5/2011 | Kitsunai et al. | |

FOREIGN PATENT DOCUMENTS

| | | |
|---|---|---|
| JP | H0696434 B2 | 4/1994 |
| JP | H11203657 A | 7/1999 |
| JP | 2000348325 A | 12/2000 |
| JP | 2001160214 A | 6/2001 |
| JP | 2008159259 A | 7/2008 |
| WO | 2010001843 A1 | 1/2010 |

OTHER PUBLICATIONS

International Search Report from corresponding PCT application PCT/JP2022/012167, dated May 24, 2022.

* cited by examiner

*Primary Examiner* — Craig A. Renner
(74) *Attorney, Agent, or Firm* — K&L Gates LLP

(57) ABSTRACT

The present technology provides a magnetic recording medium of a tape form, including: a magnetic layer; and an underlayer, in which a core part level difference Rk is 5.5 nm or less in a bearing curve generated on the basis of height data of a magnetic layer-side surface acquired using an atomic force microscope, and an average thickness of the underlayer is 1.50 μm or less. In addition, the present technology also provides a tape cartridge including the magnetic recording medium of the tape form.

14 Claims, 11 Drawing Sheets

Fig. 6

| Data number | X COORDINATE | Y COORDINATE |
|---|---|---|
| | AREA RATIO [%] | HEIGHT [nm] |
| 1 | 0.0004 | 30.332 |
| 2 | 0.0008 | 29.799 |
| 3 | 0.0011 | 29.152 |
| 4 | 0.0015 | 26.169 |
| 5 | 0.0019 | 25.424 |
| ⋮ | ⋮ | ⋮ |

MAGNETIC RECORDING MEDIUM HAVING A CORE PART LEVEL DIFFERENCE

TECHNICAL FIELD

The present technology relates to a magnetic recording medium.

BACKGROUND ART

For example, in accompaniment with development of the IoT, big data, artificial intelligence, and the like, the amount of data that is collected and stored has significantly increased. As a medium for recording a large amount of data, a magnetic recording medium is frequently used.

Regarding magnetic recording media, various technologies have been proposed until now. For example, in PTL 1, a magnetic recording medium in which a low coercive force layer, of which a coercive force measured in a longitudinal direction is equal to or less than 15.9 kA/m (200 oersted), including magnetic powders and a binding agent and a magnetic layer for signal recording including magnetic powders and a binding agent are formed on a nonmagnetic support body in this order, the magnetic layer described above includes, as the magnetic powders, iron-nitride magnetic powders that have iron or a transition element having iron as their major constituent and nitrogen as essential constituent elements, and intrinsically has a sphere shape or an oval shape having an average particle diameter of 5 to 50 nm and an average axial ratio of 1 to 2, are substantially vertically oriented, has a thickness of the magnetic layer being equal to or smaller than 300 nm, and has an average surface roughness Ra of the magnetic layer which is 1.0 to 3.2 nm is disclosed.

CITATION LIST

Patent Literature

[PTL 1]
JP 2008-159259A

SUMMARY

Technical Problem

The shorter a recording wavelength, the lower the output of a magnetic recording medium. However, also in a case in which a recording wavelength is short, it is preferable to acquire an output that is equivalent to that of a case in which the recording wavelength is long. In order to increase the output at the time of short-wavelength recording to approach the output at the time of long-wavelength recording, it is preferable that the resolution of the magnetic recording medium be high.

Thus, a main objective of the present technology is to provide a magnetic recording medium exhibiting high resolution.

Solution to Problem

The present technology provides a magnetic recording medium of a tape form, including: a magnetic layer; and an underlayer, in which a core part level difference Rk is 5.5 nm or less in a bearing curve generated on the basis of height data of a magnetic layer-side surface acquired using an atomic force microscope, and an average thickness of the underlayer is 1.50 μm or less.

A height at an area ratio of 10.00% in the bearing curve may be 2.80 nm or less.

A height at an area ratio of 20.00% in the bearing curve may be 1.70 nm or less.

A height at an area ratio of 30.00% in the bearing curve may be 1.00 nm or less.

A height at an area ratio of 40.00% in the bearing curve may be 0.50 nm or less.

The core part level difference Rk may be 5.0 nm or less.

The average thickness of the underlayer may be 1.35 μm or less.

The average thickness of the underlayer may be 0.80 μm or less.

An average thickness of the magnetic layer may be 90 nm or less.

An average thickness of the magnetic recording medium may be 5.90 μm or less. An average thickness of the magnetic recording medium may be 5.30 μm or less. A power spectrum density of the magnetic layer up to a spatial wavelength of 5 μm is 3.6 nm$^3$ or less.

The magnetic layer may include magnetic powders, and the magnetic powders may contain hexagonal ferrite, ε-iron oxide, or Co-containing spinel ferrite. Further, the present technology also provides a tape cartridge including: the magnetic recording medium of the tape form described above; a communication unit communicating with a recording and reproducing device; a storage unit; and a control unit storing information received from the recording and reproducing device through the communication unit in the storage unit, reading information from the storage unit in response to a request from the recording and reproducing device, and transmitting the information to the recording and reproducing device through the communication unit, in which the information includes adjustment information for adjusting a tension applied in a longitudinal direction of the magnetic recording medium.

BRIEF DESCRIPTION OF DRAWINGS

FIG. 6 is a diagram illustrating an example of results of a calculation program.

DESCRIPTION OF EMBODIMENTS

Figure 1:
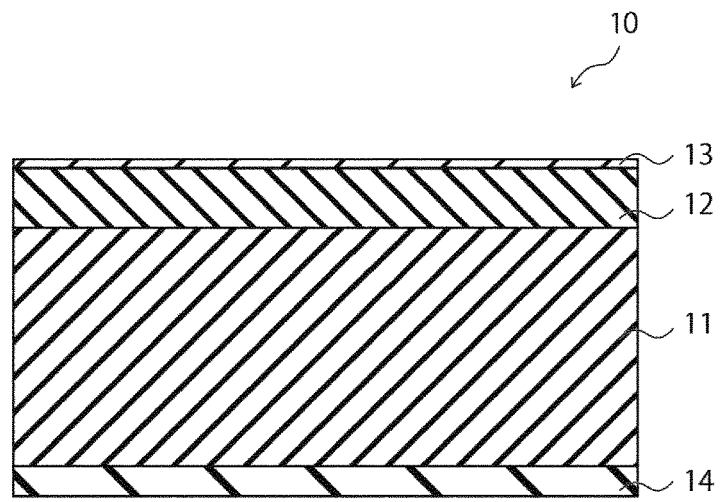
FIG. 1 is a schematic view illustrating a part of a cross-section of a magnetic recording medium.

Hereinafter, suitable embodiments for implementing the present technology will be described. Embodiments to be described below show typical embodiments of the present technology, and the scope of the present technology is not limited to these embodiments.

The present technology will be described in the following order.
1. Description of present technology
2. Embodiment (example of magnetic recording medium of coating type)
   (1) Configuration of magnetic recording medium
   (2) Physical properties of magnetic recording medium
   (3) Method for manufacturing magnetic recording medium
   (4) Recording and reproducing device
   (5) Cartridge
   (6) Effects
   (7) Modification example
3. Working Example

1. Description of Present Technology

The shorter a recording wavelength, the lower an output of a magnetic recording medium. However, even in a case in which a recording wavelength is short, it is preferable to be able to acquire an output that is equivalent to that of a case in which the recording wavelength is long. For this reason, it is necessary to raise an output at the time of short-wavelength recording to approach an output at the time of long wavelength recording. In order to raise an output at the time of short-wavelength recording, it is considered to be effective to raise resolution that is one of electromagnetic conversion characteristics of a magnetic recording medium.

The inventor reviewed technologies for raising resolution of a magnetic recording medium. As a result, the inventor discovered that there is a high correlation between resolution and a core part level difference Rk to be described below. In addition, the inventor also discovered that thin layering of an underlayer contributes to improvement of resolution. As a result of further reviews, the inventor discovered that a magnetic recording medium in which this core part level difference Rk is a specific numerical value or less, and an average thickness of an underlayer is specific numerical value or less exhibits high resolution. In other words, a magnetic recording medium according to the present technology includes a magnetic layer and an underlayer, and, in a bearing curve generated on the basis of height data of a magnetic layer-side surface acquired using an atomic force microscope, has a core part level difference Rk being 5.5 nm or less and an average thickness of the underlayer being 1.50 µm or less.

In a magnetic recording medium according to the present technology, a core part level difference Rk is 5.5 nm or less, is preferably 5.2 nm or less, more preferably 5.0 nm or less, and is 4.7 nm or less further more preferably in a bearing curve generated on the basis of height data of a magnetic layer-side surface acquired using an atomic force microscope. In accordance with this core part level difference Rk being in these numerical ranges, resolution can be improved.

The magnetic recording medium according to the present technology exhibits high resolution. The reason for this is considered to be an increase in amount of a smooth part of a magnetic layer-side surface according to the core part level difference Rk of the magnetic recording medium according to the present technology being a specific numerical value or less.

The core part level difference Rk is a value calculated using a bearing curve generated on the basis of height data of the magnetic layer-side surface acquired using an atomic force microscope, and properties and a state of the magnetic layer-side surface of the magnetic recording medium are assumed to be reflected therein. More specifically, it is assumed that the larger the core part level difference Rk, the more number of irregularities of the magnetic layer-side surface, and the smaller the core part level difference Rk, the larger a smooth part of the magnetic layer-side surface. As the magnetic layer-side surface becomes smoother, a spacing (a distance between a magnetic recording medium and a magnetic head) tends to be smaller. For this reason, in the magnetic recording medium according to the present technology in which the core part level difference Rk is a specific value or less, most of the magnetic layer-side surface can be formed to be a smooth part, and, in accordance with this, the spacing is assumed to be able to be formed small. It is assumed that this contributes to improvement of resolution of the magnetic recording medium according to the present technology.

For example, a width of the magnetic recording medium according to the present technology may be 5 mm to 30 mm, particularly 7 mm to 25 mm, more particularly 10 mm to 20 mm, and further more particularly 11 mm to 19 mm. For example, a length of the magnetic recording medium of a tape form according to the present technology may be 500 m to 1500 m. For example, according to LTO8 standards, a tape width is 12.65 mm, and a length is 960 m.

The magnetic recording medium according to the present technology is in a tape form and, for example, may be a magnetic recording tape of a long form. For example, the magnetic recording medium of a tape form according to the present technology may be housed inside a magnetic recording cartridge. More specifically, the magnetic recording medium may be housed inside this magnetic recording cartridge in a state being wound around a reel disposed inside this cartridge.

In one preferred embodiment of the present technology, the magnetic recording medium according to the present technology may include a magnetic layer, an underlayer, a base layer, and a back layer. These four layers may be stacked in this order. The magnetic recording medium according to the present technology may include another layer in addition to such layers. The other layer may be appropriately selected in accordance with a type of magnetic recording medium. For example, the magnetic recording medium according to the present technology may be a magnetic recording medium of a coating type. The magnetic recording medium of the coating type described above will be described in more detail in the following "2".

2. Embodiment of Present Technology (Example of Magnetic Recording Medium of Coating Type)

(1) Configuration of Magnetic Recording Medium

First, referring to FIG. 1, a configuration of a magnetic recording medium 10 according to an embodiment will be described. The magnetic recording medium 10 includes a base layer 11 of a long form, an underlayer 12 disposed on one principal face of the base layer 11, a magnetic layer 13 disposed on the underlayer 12, and a back layer 14 disposed on the other principal face of the base layer 11. The back layer 14 may be provided or not provided as necessary.

The magnetic recording medium 10 has a long tape form and travels in a longitudinal direction at the time of recording or reproducing. The surface of the magnetic layer 13 serves as a surface on which a magnetic head travels. It is preferable that the magnetic recording medium 10 be used by a recording and reproducing device including a ring-type head as a recording head. In this specification, a "vertical direction" represents a direction perpendicular to the surface of the magnetic recording medium 10 (a thickness direction of the magnetic recording medium 10), and a "longitudinal direction" represents a longitudinal direction (traveling direction) of the magnetic recording medium 10.

(Base Layer)

The base layer 11 is a non-magnetic support body that supports the underlayer 12 and the magnetic layer 13. The base layer 11 has a long film form. An average thickness of the base layer 11 is preferably 4.2 µm or less, more preferably 3.8 µm or less, or further more preferably 3.4 µm or less. In a case in which the average thickness of the base layer 11 is 4.2 µm or less, a recordable recording capacity in one data cartridge can be increased to be higher than that of a general magnetic recording medium. The average thickness of the base layer 11 is preferably 3.0 µm or more and is more preferably 3.2 µm or more. In a case in which the average thickness of the base layer 11 is 3.0 µm or more, a decrease in the strength of the base layer 11 can be inhibited.

The average thickness of the base layer 11 can be acquired as below. First, a magnetic recording medium 10 having a width of ½ inches is prepared and is cut into a length of 250 mm, whereby a sample is manufactured. Subsequently, layers other than the base layer 11 of the sample (that is, the underlayer 12, the magnetic layer 13 and the back layer 14) are removed using a solvent such as methyl ethyl ketone (MEK), dilute hydrochloric acid, or the like. Next, by using a laser hologram gauge (LGH-110C) manufactured by Mitutoyo Corp. as a measurement device, an average thickness of the base layer 11 is calculated by measuring thicknesses of a sample (the base layer 11) at five or more positions and simply calculating a mean (taking an arithmetic mean) of such measured values. Here, the measurement positions are randomly selected from the sample.

For example, the base layer 11 contains at least one of polyester, polyolefin, a cellulose derivative, a vinyl-based resin, and other polymeric resins. In a case in which the base layer 11 contains two or more of the materials described above, such two or more materials may be mixed, co-polymerized, or laminated.

For example, the polyester includes at least one of poly-ethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), and polyethylene bisphenoxycycloboxylate.

For example, the polyolefin includes at least one of polyethylene (PE) and polypropylene (PP). For example, the cellulose derivative includes at least one of cellulose diacetate, cellulose triacetate, cellulose acetate butyrate (CAB), and cellulose acetate propionate (CAP). The vinyl-based resin, for example, at least one of polyvinyl chloride (PVC) and polyvinylidene chloride (PVDC).

For example, the other polymeric resins include at least one of polyamide (PA, nylon), aromatic polyamide (PA, aramid), polyimide (PI), aromatic polyimide (PI), polyamide imide (PAI), aromatic polyamide imide (PAI), polybenzo-xazole (PBO; for example, xyron (registered trademark)), polyether, polyether ketone (PEK), polyether ester, polyether sulfone (PES), polyetherimide (PEI), poly-sulfone (PSF), polyphenylene sulfide (PPS), polycarbonate (PC), polyarylate (PAR), and polyurethane (PU).

For example, the base layer 11 contains polyester as a main component. This polyester, for example, may be a mixture of one or two or more of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), and polyethylene bisphenoxycarboxylate. In this specification, a "principal component" represents a component of a highest content ratio among components composing the base layer. For example, the principal component of the base layer 11 being polyester may represent that a content ratio of polyester in the base layer 11 is, for example, 50% by mass or more, 60% by mass or more, 70% by mass or more, 80% by mass or more, 90% by mass or more, 95% by mass or more, or 98% by mass or more with respect to the mass of the base layer 11 or that the base layer 11 is composed only from polyester. In this embodiment, the base layer 11 may contain a resin other than polyester described below in addition to polyester.

In accordance with a preferred embodiment of the present technology, the base layer 11 may be formed from PET or PEN.

(Magnetic Layer)

The magnetic layer 13 is a recording layer that is used for recording signals. For example, the magnetic layer 13 contains magnetic powders and a binding agent. The magnetic layer 13 may further contain at least one type of additive among a lubricant, an antistatic agent, a curing agent, a curing agent, a rust inhibitor, and a nonmagnetic reinforcing particle, and the like as necessary.

Figure 2:
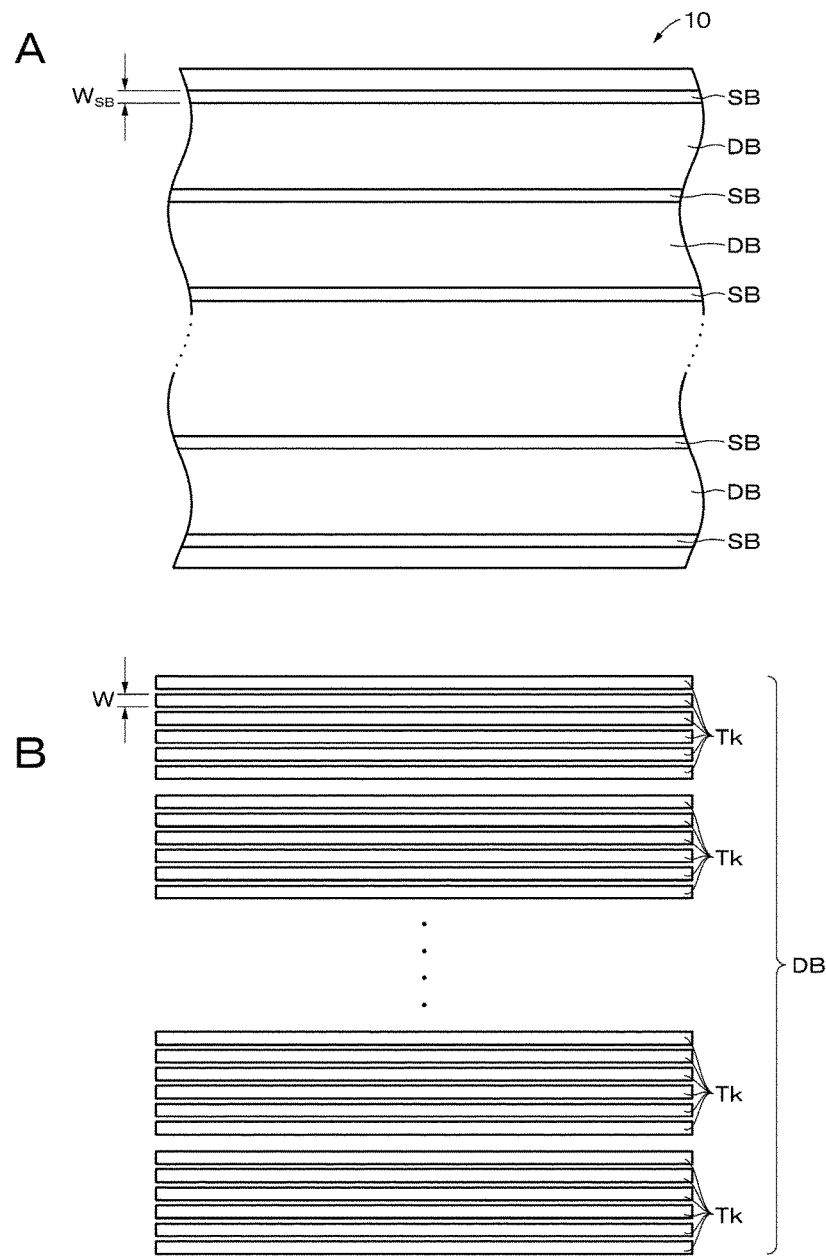
FIG. 2A is a schematic view of a layout of data bands and servo bands.
FIG. 2B is a schematic view acquired by enlarging data bands.

As illustrated in FIG. 2A, it is preferable that the magnetic layer 13 include a plurality of servo bands SB and a plurality of data bands DB in advance. The plurality of servo bands SB are disposed at equal spaces in a widthwise direction of the magnetic recording medium 10. A data band DB is provided between adjacent servo bands SB. In the servo band SB, a servo signal for tracking control of a magnetic head is written in advance. User data is recorded in the data band DB.

From a point of view of securement of a high recording capacity, a ratio $R_S(=(S_{SB}/S)\times 100)$ of a total area $S_{SB}$ of the servo band SB to an area S of the surface of the magnetic layer 13 is preferably 4.0% or less, more preferably 3.0% or less, and, further more preferably, 2.0% or less. On the other hand, from a point of view of securement of 5 or more servo tracks, the ratio $R_S$ of the total area $S_{SB}$ of the servo band SB to the area S of the surface of the magnetic layer 13 is preferably 0.8 or more.

The ratio $R_S$ of the total area $S_{SB}$ of the servo band SB to the area S of the entire surface of the magnetic layer 13 can be acquired as below. For example, the magnetic recording medium 10 is developed using a ferricolloid developing solution (manufactured by Sigma Chemical; SigMarker Q), then, the developed magnetic recording medium 10 is observed using an optical microscope, and a servo band width $W_{SB}$ and the number of servo bands SB are measured. Next, the ratio $R_S$ is obtained from the following formula.

$$\text{Ratio } R_S[\%] = \bigl(((\text{Servo Band Width } W_{SB}) \times (\text{Number of Servo Bands}))/$$
$$(\text{Width of Magnetic Recording Medium 10})\bigr) \times 100$$

The number of servo bands SB is preferably 5 or more and more preferably 5+4n (here, n is a positive integer). As above, the number is further more preferably 9+4n or more. In a case in which the number servo bands SB is 5 or more, an influence on a servo signal according to a dimensional change of the magnetic recording medium 10 in a widthwise direction is inhibited, and stable recording and reproducing characteristics having less off-tracks can be secured. Although the number of servo bands SB is not particularly limited, for example, it is 33 or less.

The number of servo bands SB can be checked as below. First, the surface of the magnetic layer 13 is observed using a magnetic force microscope (MFM), and an MFM image is acquired. Next, the number of servo bands SB is counted using the MFM image.

From a point of view of securement of a high recording capacity, the servo band width $W_{SB}$ is preferably 95 µm or less, more preferably 60 µm or less, and further more preferably 30 µm or less. Preferably, the servo band width $W_{SB}$ is 10 µm or more. It is difficult to manufacture a recording head that can read a servo signal having a servo band width $W_{SB}$ less than 10 µm.

A width of the servo band width $W_{SB}$ can be acquired as below. First, the surface of the magnetic layer 13 is observed using a magnetic force microscope (MFM), whereby an MFM image is acquired. Next, the width of the servo band width $W_{SB}$ is measured using the MFM image.

As illustrated in FIG. 2B, the magnetic layer 13 is configured such that a plurality of data tracks Tk can be formed in the data band DB. From a point of view of securement of a high recording capacity, a data track width W is preferably 2.0 µm or less, more preferably 1.5 µm or less, and further more preferably 1.0 µm or less. Preferably, the data track width W is 0.02 µm or more.

The data track width W can be acquired as below. For example, a data recording pattern of a data band part of the magnetic layer 13 in which data is recorded on the entire face is observed using a magnetic force microscope (MFM), and an MFM image is acquired. As the MFM, Dimension 3100 manufactured by Digital Instruments Inc. and analysis software thereof are used. A measurement area on this MFM image is configured to be 10 µm×10 µm, and this measurement area of 10 µm×10 µm is divided into 512×512 (=262, 144) measurement points. Measurement is performed for three 10 µm×10 µm measurement areas of different places using the MFM, whereby three MFM images can be acquired. From the acquired three MFM images, track widths are measured at 10 places using analysis software belonging to Dimension 3100, and an average value (a simple average) thereof is taken. The average value is the data track width W. In addition, measurement conditions of the MFM described above include a sweep rate: 1 Hz, a used chip: MFMR-20, a lift height: 20 nm, and correction: Flatten order 3.

The magnetic layer 13 is configured to be able to record data such that a minimum value L of an inter-magnetization reversal distance and a data track width W are preferably W/L≤200, more preferably W/L≤60, further more preferably W/L≤45, and particularly preferably W/L≤30. When the minimum value L of the inter-magnetization reversal distance is a constant value, and the minimum value L of the inter-magnetization reversal distance and the track width W satisfy a condition of W/L>200 (in other words, when the track width W is large), the track recording density becomes not high, and there is concern that a recording capacity cannot be sufficiently secured. In addition, when the track width W is a constant value, and the minimum value L of the inter-magnetization reversal distance and the track width W satisfy W/L>200 (in other words, when the minimum value L of the inter-magnetization reversal distance is short), a bit length becomes small, and a linear recording density becomes high, but there is concern that the signal-to-noise ratio (SNR) becomes remarkably low due to the influence of a spacing loss. Thus, in order to inhibit deterioration of the SNR while a recording capacity is secured, as described above, it is preferable that W/L be in the range of W/L≤60. However, W/L is not limited to the range described above and thus may be W/L≤23 or W/L≤13. The lower limit value of W/L is not particularly limited, and is, for example, 1≤W/L.

From a point of view of securement of a high recording capacity, the magnetic layer 13 is configured to be able to record data such that the minimum value L of the inter-magnetization reversal distance is preferably 55 nm or less, more preferably 53 nm or less, further more preferably 52 nm or less, 50 nm or less, 48 nm or less, or 44 nm or less, and particularly preferably 40 nm or less. The lower limit value of the minimum value L of the inter-magnetization reversal distance is preferably 20 nm or more in consideration of the magnetic particle size. The minimum value L of the inter-magnetization reversal distance is determined in consideration of a magnetic particle size.

The minimum value L of the inter-magnetization reversal distance can be acquired as below. For example, a data recording pattern of a data band part of the magnetic layer 13 in which data is recorded on the entire face is observed using a magnetic force microscope (MFM), and an MFM image is acquired. As the MFM, Dimension 3100 manufactured by Digital Instruments Inc. and analysis software thereof are used. A measurement area on this MFM image is configured to be 2 µm×2 µm, and this measurement area of 2 µm×2 µm is divided into 512×512 (=266, 144) measurement points. Three 2 µm×2 µm measurement areas at different locations are measured using the MFM, that is, three MFM images are obtained. 50 inter-bit distances are measured from the two-dimensional unevenness chart of the recording pattern of the obtained MFM image. The inter-bit distance is measured using analysis software bundled in Dimension 3100. The value that is approximately the greatest common divisor of the measured 50 inter-bit distances is the minimum value L of the inter-magnetization reversal distance. In addition, measurement conditions are a sweep rate: 1 Hz, a used chip: MFMR-20, a lift height: 20 nm, and correction: Flatten order 3.

An average thickness $t_m$ of the magnetic layer 13 is preferably 90 nm or less, particularly preferably 80 nm or less, more preferably 70 nm or less, and further more preferably 60 nm or less. In a case in which an average thickness of the magnetic layer 13 is 90 nm or less, and a ring-type head is used as a recording head, magnetization can be uniformly recorded in a thickness direction of the magnetic layer 13, and thus an electromagnetic conversion characteristic (for example, an SNR) can be improved.

The average thickness $t_m$ of the magnetic layer 13 is preferably 30 nm or more and more preferably 35 nm or more. In a case in which the average thickness of the magnetic layer 13 is 30 nm or more, and an MR-type head is used as a reproduction head, an output can be secured, and thus an electromagnetic conversion characteristic (for example, an SNR) can be improved.

A numerical range of the average thickness $t_m$ of the magnetic layer 13 may be defined using any one of the upper limit values described above and any one of the lower limit values described above and is preferably 30 nm≤$t_m$≤90 nm or 35 nm≤$t_m$≤80 nm, 35 nm≤$t_m$≤70 nm, or 35 nm≤$t_m$≤60 nm.

For example, the average thickness $t_m$ of the magnetic layer 13 can be acquired as below. The magnetic recording medium 10 is processed using a focused ion beam (FIB) method or the like, whereby slicing is performed. In a case in which the FIB method is used, as pre-processing for observing a TEM image of a cross-section to be described below, a carbon film and a tungsten thin film are formed as protection films. This carbon film is formed on a magnetic layer-side surface and a back layer-side surface of the magnetic recording medium 10 using a deposition method, and this tungsten thin film is further formed on the magnetic layer-side surface using a deposition method or a sputtering method. This slicing is performed in a longitudinal direction (a long-side direction) of the magnetic recording medium 10. In other words, in accordance with this slicing, a cross-section parallel to both the longitudinal direction and the thickness direction of the magnetic recording medium 10 is formed.

The above-described cross-section of the acquired thinned sample is observed under the following conditions using a transmission electron microscope (TEM), whereby a TEM image is acquired. In addition, in accordance with a type of device, a magnification and an acceleration voltage may be appropriately adjusted.

Device: TEM (H9000NAR commercially available from Hitachi, Ltd.)
Acceleration voltage: 300 kV
Magnification: 100,000 times Next, thicknesses of the magnetic layer 13 are measured at positions of at least 10 or more points in the longitudinal direction of the magnetic recording medium 10 using the acquired TEM image. An average value acquired by simply averaging acquired measured values (an arithmetic mean) is set as an average thickness $t_m$[nm] of the magnetic layer 13. Here, the positions at which the measurement is performed are randomly selected from the test piece.

(Magnetic Powder)

Examples of magnetic particles forming magnetic powders included in the magnetic layer 13 include hexagonal ferrite, an epsilon-type iron oxide (ε-iron oxide), Co-containing spinel ferrite, gamma hematite, magnetite, chromium dioxide, a cobalt-coated iron oxide, metal, and the like but are not limited thereto. The magnetic powders described above may be one of these or may be a combination of two or more thereof. Preferably, the magnetic powders described above may contain hexagonal ferrite, an ε-iron oxide, or Co-containing spinel ferrite. Particularly preferably, the magnetic powders are hexagonal ferrite. The hexagonal ferrite, particularly preferably, may contain at least one of Ba and Sr. The ε-iron oxide, particularly preferably, may contain at least one of Al and Ga. For example, such magnetic particles may be appropriately selected by a person skilled in the art on the basis of factors such as a method for manufacturing the magnetic layer 13, standards of a tape, a function of the tape, and the like.

The shape of a magnetic particle depends on a crystal structure of the magnetic particle. For example, barium ferrite (BaFe) and strontium ferrite may have a hexagonal shape. The ε-iron oxide may have a sphere shape. The cobalt ferrite may have a cuboidal shape. The metal may have a spindle shape. In the process of manufacturing the magnetic recording medium 10, such magnetic particles are oriented.

An average particle size of the magnetic powders may be preferably 50 nm or less, more preferably 40 nm or less, and further more preferably 30 nm or less, 25 nm or less, 22 nm or less, 21 nm or less, or 20 nm or less. For example, the average particle size described above may be 10 nm or more and, more preferably, 12 nm or more.

For example, an average aspect ratio of the magnetic powders is 1.0 or more and 3.0 or less and may be 1.0 or more and 2.9 or less.

(Embodiment in which Magnetic Powders Contain Hexagonal Ferrite)

According to a preferred embodiment of the present technology, magnetic powders contain hexagonal ferrite and, more particularly, may contain powders of nano particles containing hexagonal ferrite (hereinafter, referred to as "hexagonal ferrite particles"). Preferably, the hexagonal ferrite is hexagonal ferrite having an M-type structure. For example, the hexagonal ferrite has a hexagonal plate shape or an approximately hexagonal plate shape. The hexagonal ferrite may preferably contain at least one of Ba, Sr, Pb, and Ca and more preferably contain at least one of Ba, Sr, and Ca. More specifically, the hexagonal ferrite, for example, is a combination of one or two or more selected from barium ferrite, strontium ferrite, and calcium ferrite and particularly preferably barium ferrite or strontium ferrite. The barium ferrite may further contain at least one of Sr, Pb, and Ca in addition to Ba. The strontium ferrite may further contain at least one of Ba, Pb, and Ca in addition to Sr.

More specifically, the hexagonal ferrite may have an average composition represented by a general formula of $MFe_{12}O_{19}$. Here, for example, M is metal of at least one of Ba, Sr, Pb, and Ca and is preferably metal of at least one of Ba and Sr. M may be a combination of Ba and metal of one or more selected from a group consisting of Sr, Pb, and Ca. In addition, M may be a combination of Sr and metal of one or more selected from a group consisting of Ba, Pb, and Ca. In the above general formula, some of Fe may be replaced with other metal elements.

In a case in which the magnetic powders include powders of hexagonal ferrite particles, an average particle size of the magnetic powders may be preferably 50 nm or less, more preferably 40 nm or less, and further more preferably 30 nm or less, 25 nm or less, 22 nm or less, 21 nm or less, or 20 nm or less. For example, the average particle size described above is 10 nm or more, preferably 12 nm or more, and more preferably 15 nm or more. For example, the average particle size of the magnetic powders described above may be 10 nm or more and 50 nm or less, 10 nm or more and 40 nm or less, 12 nm or more and 30 nm or less, 12 nm or more and 25 nm or less, or 15 nm or more and 22 nm or less. In a case in which the average particle size of magnetic powders is the upper limit value described above or less (for example, in a case in which the average particle size is 50 nm or less and, more particularly, 30 nm or less), in the magnetic recording medium 10 of a high recording density, satisfactory electromagnetic conversion characteristics (for example, an SNR) can be acquired. In a case in which the average particle size of magnetic powders is the lower limit value described above or more (for example, in a case in which the average particle size is 10 nm or more and, more preferably, 12 nm or more), the dispersibility of magnetic powders is further improved, and more satisfactory electromagnetic conversion characteristics (for example, an SNR) can be acquired.

In a case in which the magnetic powders include powders of hexagonal ferrite particles, an average aspect ratio of the magnetic powders is preferably 1.0 or more and 3.0 or less, more preferably 1.0 or more and 2.9 or less, and further more preferably 2.0 or more and 2.9 or less. By configuring the average aspect ratio of the magnetic powders to be within the numerical range described above, aggregation of the magnetic powders can be inhibited, and, when the magnetic powders are vertically oriented in the process of forming the magnetic layer 13, resistance applied to the magnetic powders can be inhibited. This can bring improvement of vertical orientation of the magnetic powders.

In a case in which the magnetic powders include powders of hexagonal ferrite particles, an average particle size and an average aspect ratio of the magnetic powders can be acquired as below. First, a magnetic recording medium 10 that is a measurement target is processed using a focused ion beam (FIB) method or the like, whereby slicing is performed. In a case in which the FIB method is used, as pre-processing for observing a TEM image of a cross-section to be described below, a carbon film and a tungsten thin film are formed as protection films. This carbon film is formed on a magnetic layer-side surface and a back layer-side surface of the magnetic recording medium 10 using a deposition method, and this tungsten thin film is further formed on the magnetic layer-side surface using a deposition method or a sputtering method. This slicing is performed in a longitudinal direction (a long-side direction) of the magnetic recording medium 10. In other words, in accordance with this slicing, a cross-section that is parallel to both a longitudinal direction and a thickness direction of the magnetic recording medium 10 is formed.

The above-described cross-section of an acquired sliced sample is observed using a transmission electronic microscope (H-9500 manufactured by Hitachi High Technologies Inc.) with an acceleration voltage: 200 kV and total magnification: 500,000 times such that the whole magnetic layer 13 is included in the thickness direction of the magnetic layer 13, whereby a TEM photograph is taken.

Figure 3:
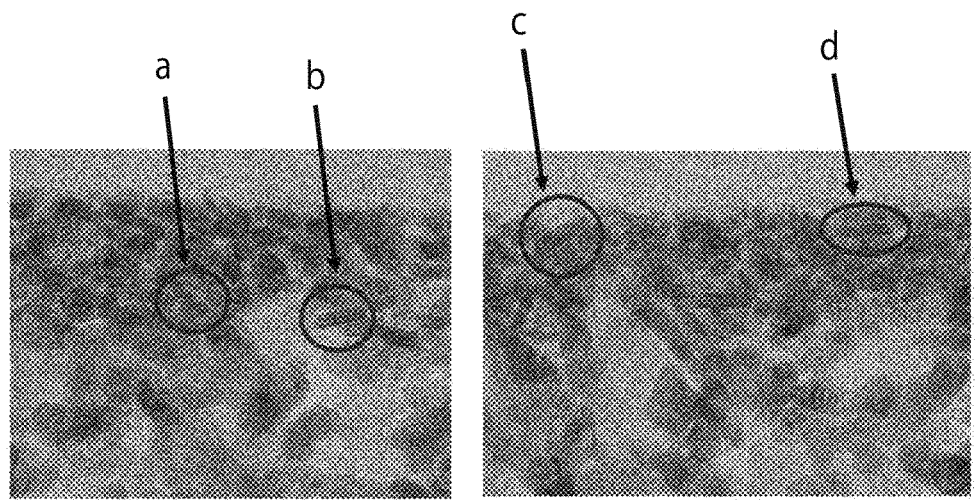
FIG. 3 is an example of a TEM photograph of a magnetic layer.

Next, from the taken TEM photograph, 50 particles which face the side face in the direction of an observation face and of which particle thicknesses can be clearly checked are selected. For example, an example of the TEM photograph is illustrated in FIG. 3. In FIG. 3, for example, particles, which are denoted by a and d, of which thickness can be clearly checked and thus are selected. Maximum plate thicknesses DA of the selected 50 particles are measured. By simply averaging (taking an arithmetic mean of) the plate thicknesses DA acquired in this way, an average maximum plate thickness $DA_{ave}$ is acquired.

Subsequently, a plate diameter DB of each magnetic powder is measured. In order to measure the plate diameter DB of particles, from the taken TEM photograph, 50 particles of which plate diameters can be clearly checked are selected. For example, in FIG. 3, for example, particles denoted by b and c have plate diameters that can be clearly checked and thus are selected. A plate diameter DB of each of the selected 50 particles is measured. By simply averaging (taking an arithmetic mean of) the plate diameters DB acquired in this way, an average plate diameter $DB_{ave}$ is acquired. The average plate diameter $DB_{ave}$ is an average particle size.

Then, an average aspect ratio ($DB_{ave}/DA_{ave}$) of the particles is acquired from the average maximum plate thickness $DA_{ave}$ and the average plate diameter $DB_{ave}$.

In a case in which magnetic powders include powders of hexagonal ferrite particles, an average particle volume of the magnetic powders may be preferably 2500 nm³ or less, preferably 2000 nm³ or less, more preferably 1800 nm³ or less, and further more preferably 1700 nm³ or less, 1600 nm³ or less, or 1500 nm³ or less. The average particle volume of the magnetic powders may be preferably 500 nm³ or more and more preferably 700 nm³ or more.

In a case in which the average particle volume of the magnetic powders is the upper limit value described above or less (for example, 2500 nm³ or less), satisfactory electromagnetic conversion characteristics (for example, an SNR) in the magnetic recording medium 10 of a high recording density can be acquired.

In a case in which the average particle volume of the magnetic powders is the lower limit value described above or more (for example, 500 nm³ or more), the dispersibility of the magnetic powders is further improved, and more satisfactory electromagnetic conversion characteristics (for example, an SNR) can be acquired.

The average particle volume of the magnetic powder is obtained as follows. First, as described in relation to the method for calculating an average particle size of the magnetic powders described above, an average maximum plate thickness $DA_{ave}$ and an average plate diameter $DB_{ave}$ are acquired. Next, by using the following equation, an average particle volume V of the magnetic powders is acquired.

$$V = \frac{3\sqrt{3}}{8} \times DA_{ave} \times DB_{ave} \times DB_{ave} \qquad \text{[Math. 1]}$$

According to a particularly preferred embodiment of the present technology, the magnetic powders are barium ferrite magnetic powders or strontium ferrite magnetic powders and, more preferably, may be barium ferrite magnetic powders. The barium ferrite magnetic powders contain magnetic particles of an iron oxide having barium ferrite as its main phase (hereinafter, referred to as "barium ferrite particles"). For example, the barium ferrite magnetic powders have an antimagnetic force not weakened even in a high-temperature high-humidity environment and the like and thus have high reliability of data recording. From such a point of view, the barium ferrite magnetic powders are preferable as the magnetic powders described above.

An average particle size of barium ferrite magnetic powders is 50 nm or less, more preferably 10 nm or more and 40 nm or less, and further more preferably 12 nm or more and 25 nm or less.

In a case in which the magnetic layer 13 includes barium ferrite magnetic powders as magnetic powders, an average thickness $t_m$[nm] of the magnetic layer 13 is preferably 90 nm or less and more preferably 80 nm or less. For example, the average thickness $t_m$ of the magnetic layer 13 may be 35 nm≤$t_m$≤90 nm or 35 nm≤$t_m$≤80 nm.

In addition, a coercive force Hc1 measured in the thickness direction (the vertical direction) of the magnetic recording medium 10 is preferably 2010 [Oe] or more and 3520 [Oe] or less, more preferably 2070 [Oe] or more and 3460 [Oe] or less, and further more preferably 2140 (Oe) or more and 3390 [Oe] or less.

(Embodiment in which Magnetic Powder Includes ε-Iron Oxide)

According to another preferred embodiment of the present technology, the magnetic powders described above preferably may include powders of nano particles containing ε-iron oxide (hereinafter, referred to as "ε-iron oxide particles"). The ε-iron oxide particles can obtain a high coercive force even in the case of fine particles. It is preferable that an ε-iron oxide included in the ε-iron oxide particles be crystalized and oriented with priority in the thickness direction (the vertical direction) of the magnetic recording medium 10.

The ε-iron oxide particle has a sphere shape or an approximately sphere shape or has a cubic shape or an approximately cubit shape. Since the ε-iron oxide particle has the shape as described above, in a case in which the ε-iron oxide particles are used as magnetic particles, compared to a case in which barium ferrite particles of a hexagonal plate shape as magnetic particles are used, a contact area between particles in the thickness direction of the medium is decreased, and thus aggregation between the particles can be inhibited. Thus, the dispersibility of magnetic powders is raised, and a more satisfactory SNR can be acquired.

Figure 4:
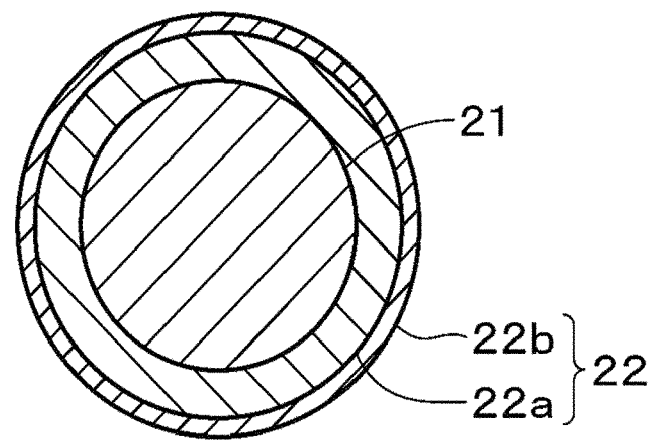
FIG. 4 is a schematic view illustrating a configuration of a cross-section of a magnetic particle.

The ε-iron oxide particle may have a core shell-type structure. More specifically, as illustrated in FIG. 4, the ε-iron oxide particle includes a core part 21 and a shell part 22 of a two-layer structure disposed on the periphery of the core part 21. The shell part 22 of the two-layer structure includes a first shell part 22a disposed on the core part 21 and a second shell part 22b disposed on the first shell part 22a.

The core part 21 contains ε-iron oxide. The ε-iron oxide contained in the core part 21 preferably has a ε-Fe$_2$O$_3$ crystal as its main phase and is more preferably formed from ε-Fe$_2$O$_3$ of a single phase.

The first shell part 22a covers at least a part of the periphery of the core part 21. More specifically, the first shell part 22a may partly cover the periphery of the core part 21 or may cover the entire periphery of the core part 21. Assuming that exchange coupling of the core part 21 and the first shell part 22a is sufficient, and, from a point of view of improvement of magnetic characteristics, it is preferable that the first shell part 22a cover the entire surface of the core part 21.

The first shell part 22a is so-called a soft magnetic layer and, for example, may include a soft magnetic body of α-Fe, a Ni—Fe alloy, a Fe—Si—Al alloy, or the like. α-Fe may be acquired by reducing an ε-iron oxide contained in the core part 21.

The second shell part 22b is an oxide film as an oxidation prevention layer. The second shell part 22b may contain an α-iron oxide, an aluminum oxide, or a silicon oxide. For example, the α-iron oxide may contain at least one type of iron oxide among Fe$_3$O$_4$, Fe$_2$O$_3$, and FeO. In a case in which the first shell part 22a contains α-Fe (a soft magnetic body), the α-iron oxide may be acquired by oxidating α-Fe contained in the first shell part 22a.

By including the first shell part 22a as described above, the ε-iron oxide particle can secure heat stability, and, in accordance with this, while the coercive force Hc of the core part 21 single part is maintained at a large value, and/or the coercive force Hc of ε-iron oxide particles (core shell particles) as a whole can be adjusted to a coercive force Hc that is appropriate for recording. In addition, in accordance with the ε-iron oxide particle including the second shell part 22b as described above, in the process of manufacturing the magnetic recording medium 10 and before the process, deterioration of characteristics of the ε-iron oxide particle according to the ε-iron oxide particle being exposed to the air and generation of rust and the like on the particle surface can be inhibited. Thus, deterioration of the characteristics of the magnetic recording medium 10 can be inhibited.

Figure 5:
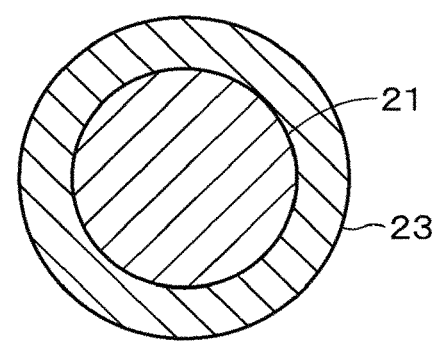
FIG. 5 is a schematic view illustrating a configuration of a cross-section of a magnetic particle of a modification example.

As illustrated in FIG. 5, the ε-iron oxide particle may include a shell part 23 of a single-layer structure. In such a case, the shell part 23 has a configuration similar to the first shell part 22a. Here, from a point of view of inhibiting deterioration of characteristics of the ε-iron oxide particle, it is preferable that the ε-iron oxide particle include a shell part 22 of a two-layer structure.

The ε-iron oxide particle may include an additive in place of the core shell structure or may have a core shell structure and include an additive. In such a case, a part of Fe of the ε-iron oxide particle is substituted with the additive. Also in accordance with the ε-iron oxide particle including an additive, the coercive force Hc of the entire ε-iron oxide particle can be adjusted to a coercive force Hc that is appropriate for recording, and thus easiness in recording can be improved. The additive is a metal element other than iron, preferably a trivalent metal element, and more preferably one or more selected from a group consisting of aluminum (Al), gallium (Ga), and indium (In).

More specifically, the ε-iron oxide containing an additive is a ε-Fe$_{2-x}$M$_x$O$_3$ crystal (here, M is a metal element other than iron, preferably a trivalent metal element, and more preferably one or more selected from a group consisting of Al, Ga, and In; x, for example, is 0<x<1).

The average particle size (an average maximum particle size) of magnetic powders is preferably 22 nm or less, more preferably 8 nm or more and 22 nm or less, and further more preferably 12 nm or more and 22 nm or less. In the magnetic recording medium 10, an area of a size that is ½ of a recording wavelength becomes an actual magnetization area. For this reason, by setting the average particle size of magnetic powders to be a half of a shortest recording wavelength or less, a satisfactory SNR can be acquired. Thus, in a magnetic recording medium 10 of a high recording density in which an average particle size of magnetic powders is 22 nm or less (for example, a magnetic recording medium 10 configured to be able to record signals with a shortest recording wavelength of 44 nm or less), satisfactory electromagnetic conversion characteristics (for example, an SNR) can be acquired. On the other hand, in a case in which the average particle size of magnetic powders is 8 nm or more, the dispersibility of the magnetic powders is further improved, and more satisfactory electromagnetic conversion characteristics (for example, an SNR) can be acquired.

An average aspect ratio of magnetic powders is preferably 1.0 or more and 3.0 or less, more preferably 1.0 or more and 2.9 or less, and further more preferably 1.0 or more and 2.5 or less. When the average aspect ratio of the magnetic powders is in the numerical range described above, aggregation of the magnetic powders can be inhibited, and when the magnetic powders are vertically oriented in the process of forming the magnetic layer 13, resistance applied to the magnetic powders can be inhibited. Thus, a vertical orientation property of the magnetic powder can be improved.

In a case in which magnetic powders include ε-iron oxide particles, an average particle size and an average aspect ratio of the magnetic powders can be acquired as below. First, a magnetic recording medium 10 that is a measurement target is processed using a focused ion beam (FIB) method or the like, whereby slicing is performed. In a case in which the FIB method is used, as pre-processing for observing a TEM image of a cross-section to be described below, a carbon film and a tungsten thin film are formed as protection films. This carbon film is formed on a magnetic layer-side surface and a back layer-side surface of the magnetic recording medium 10 using a deposition method, and this tungsten thin film is further formed on the magnetic layer-side surface using a deposition method or a sputtering method. This slicing is performed in a longitudinal direction (a long-side direction)

of the magnetic recording medium 10. In other words, in accordance with this slicing, a cross-section that is parallel to both a longitudinal direction and a thickness direction of the magnetic recording medium 10 is formed.

The above-described cross-section of an acquired sliced sample is observed using a transmission electronic microscope (H-9500 manufactured by Hitachi High Technologies Inc.) with an acceleration voltage: 200 kV and total magnification: 500,000 times such that the whole magnetic layer 13 is included in the thickness direction of the magnetic layer 13, whereby a TEM photograph is taken.

Next, from the taken TEM photograph, 50 particles of which particle shapes can be clearly checked are selected, and a major axis length DL and a minor axis length DS of each particle are measured. Here, a major axis length DL represents a maximum distance (so-called a maximum ferret diameter) among distances between two parallel lines drawn from all the angles to be in contact with a contour of each particle. On the other hand, a minor axis length DS represents a maximum length among lengths of a particle in directions orthogonal to the major axis (DL) in the particle.

Subsequently, an average major axis length $DL_{ave}$ is obtained by simply averaging (taking an arithmetic mean of) these major axis lengths DL of the measured 50 particles. The average major axis length $DL_{ave}$ acquired in this way is set as an average particle size of the magnetic powders. In addition, by simply averaging (taking an arithmetic mean of) minor axis lengths DS of 50 particles that have been measured, an average minor axis length $DS_{ave}$ is acquired. Then, from the average major axis length $DL_{ave}$ and the average minor axis length $DS_{ave}$, an average aspect ratio ($DL_{ave}/DS_{ave}$) of the particle is acquired.

An average particle volume of the magnetic powders may be preferably 2000 nm$^3$ or less, preferably 1900 nm$^3$ or less, more preferably 1800 nm$^3$ or less, and further more preferably 1700 nm$^3$ or less, 1600 nm$^3$ or less, or 1500 nm$^3$ or less. The average particle volume of the magnetic powders may be preferably 500 nm$^3$ or more and more preferably 700 nm$^3$ or more.

In a case in which the average particle volume of the magnetic powders is the upper limit value described above or less (for example, 2000 nm$^3$ or less), satisfactory electromagnetic conversion characteristics (for example, an SNR) in the magnetic recording medium 10 of a high recording density can be acquired. In a case in which the average particle volume of the magnetic powders is the lower limit value described above or more (for example, 500 nm$^3$ or more), the dispersibility of the magnetic powders is further improved, and more satisfactory electromagnetic conversion characteristics (for example, an SNR) can be acquired.

In a case in which ε-iron oxide particle has a sphere shape or an approximate sphere shape, an average particle volume of the magnetic powders can be acquired as below. First, an average major axis length $DL_{ave}$ is obtained in the same manner as in the method of calculating the average particle size of the magnetic powder. Next, an average particle volume V of the magnetic powders is obtained by the following formula.

$$V = (\pi/6) \times DL_{ave}^3$$

In a case in which ε-iron oxide particle has a cubic shape, an average particle volume of magnetic powders can be acquired as below. The magnetic recording medium 10 is processed using a focused ion beam (FIB) method or the like, whereby slicing is performed. In a case in which the FIB method is used, as pre-processing for observing a TEM image of a cross-section to be described below, a carbon film and a tungsten thin film are formed as protection films. This carbon film is formed on a magnetic layer-side surface and a back layer-side surface of the magnetic recording medium 10 using a deposition method, and this tungsten thin film is further formed on the magnetic layer-side surface using a deposition method or a sputtering method. This slicing is performed in a longitudinal direction (a long-side direction) of the magnetic recording medium 10. In other words, in accordance with this slicing, a cross-section parallel to both the longitudinal direction and the thickness direction of the magnetic recording medium 10 is formed.

The acquired sliced sample is observed using a transmission electronic microscope (H-9500 manufactured by Hitachi High Technologies Inc.) with an acceleration voltage: 200 kV and total magnification: 500,000 times such that the whole magnetic layer 13 is included in the thickness direction of the magnetic layer 13, whereby a TEM photograph is acquired. In addition, the magnification and the acceleration voltage may be appropriately adjusted in accordance with a type of device.

Next, from the taken TEM photograph, 50 particles of which shapes are clear are selected, and a length DC of a side of each particle is measured. Subsequently, by simply averaging (taking an arithmetic mean of) lengths DC of sides of the 50 particles that have been measured, whereby an average side length $DC_{ave}$ is acquired. Next, by using the average side length $DC_{ave}$, an average particle volume $V_{ave}$ (particle volume) of the magnetic powders is acquired from the following equation.

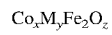

$$V_{ave} = DC_{ave}^3$$

The coercive force Hc of the ε-iron oxide particle is preferably 2500 Oe or more and more preferably 2800 Oe or more and 4200 Oe or less.

(Embodiment in which Magnetic Powder Includes Co-Containing Spinel Ferrite)

According to further another preferred embodiment of the present technology, magnetic powders may include powders of nano particles containing Co-containing spinel ferrite (hereinafter, also referred to as "cobalt ferrite particles"). In other words, this magnetic powder may be cobalt ferrite magnetic powders. The cobalt ferrite particles preferably have uniaxial crystal anisotropy. For example, the cobalt ferrite magnetic have a cubic shape or an approximately cubic shape. The Co-containing spinel ferrite may further include one or more selected from a group consisting of Ni, Mn, Al, Cu, and Zn in addition to Co.

For example, cobalt ferrite has an average composition represented in the following formula.

$$Co_xM_yFe_2O_z$$

(Here, in the formula described above, for example, M is a metal of one or more selected from a group consisting of Ni, Mn, Al, Cu, and Zn. x is a value in the range of $0.4 \leq x \leq 1.0$. y is a value in the range of $0 \leq y \leq 0.3$. Here x and y satisfy a relationship of $(x+y) \leq 1.0$. z is a value in the range of $3 \leq z \leq 4$. A part of Fe may be substituted with another metal element.)

An average particle size of cobalt ferrite magnetic powders is preferably 25 nm or less and more preferably 23 nm or less. A coercive force Hc of cobalt ferrite magnetic powders is preferably 2500 Oe or more and more preferably 2600 Oe or more and 3500 Oe or less.

In a case in which the magnetic powders include powders of cobalt ferrite particles, an average particle size of the magnetic powders may be preferably 25 nm or less and more preferably 10 nm or more and 23 nm or less. In a case in which the average particle size of magnetic powders is 25 nm or less, in the magnetic recording medium 10 of a high recording density, satisfactory electromagnetic conversion characteristics (for example, an SNR) can be acquired. In a case in which the average particle size of magnetic powders is 10 nm or more, the dispersibility of magnetic powders is further improved, and more satisfactory electromagnetic conversion characteristics (for example, an SNR) can be acquired. In a case in which the magnetic powders include powders of cobalt ferrite particles, an average aspect ratio and an average particle size of the magnetic powders can be acquired using the same methods as those of a case in which the magnetic powders include ε-iron oxide particles.

An average particle volume of the magnetic powders may be preferably 2000 nm$^3$ or less, preferably 1900 nm$^3$ or less, more preferably 1800 nm$^3$ or less, and further more preferably 1700 nm$^3$ or less, 1600 nm$^3$ or less, or 1500 nm$^3$ or less. The average particle volume of the magnetic powders may be preferably 500 nm$^3$ or more and more preferably 700 nm$^3$ or more.

In a case in which the average particle volume of the magnetic powders is the upper limit value described above or less (for example, 2000 nm$^3$ or less), satisfactory electromagnetic conversion characteristics (for example, an SNR) in the magnetic recording medium 10 of a high recording density can be acquired. In a case in which the average particle volume of the magnetic powders is the lower limit value described above or more (for example, 500 nm$^3$ or more), the dispersibility of the magnetic powders is further improved, and more satisfactory electromagnetic conversion characteristics (for example, an SNR) can be acquired.

(Binding Agent)

As a biding agent, a resin having a structure acquired by causing a cross-linking reaction on a polyurethan resin, a vinyl chloride resin, or the like is preferable. However, the binding agent is not limited thereto, and any other resin may be appropriately mixed in accordance with physical properties required for the magnetic recording medium 10. Generally, a resin to be mixed is not particularly limited, as long as it is a resin that is generally used in the magnetic recording medium 10 of coating type.

As the binding agent described above, for example, a combination of one or two or more selected from polyvinyl chloride, polyvinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, and nitrocellulose), styrene butadiene copolymers, polyester resins, amino resins, and synthetic rubber.

In addition, as the binding agent described above, thermosetting resins or reaction-type resins may be used. Examples of the thermosetting resins or the reaction-type resins include phenolic resins, epoxy resins, urea resins, melamine resins, alkyd resins, silicone resins, polyamine resins, and urea formaldehyde resins.

In addition, as each binding agent described above, for the purpose of improving dispersibility of magnetic powders, polar functional groups such as —SO$_3$M, —OSO$_3$M, —COOM, P=O(OM)$_2$, and the like may be introduced. Here, in the formula, M is a hydrogen atom or an alkali metal, for example, such as lithium, potassium, natrium, or the like.

In addition, examples of the functional group include a side-chain type having a terminal group of —NR1R2 and —NR1R2R3$^+$X$^-$ and a main chain type of >NR1R2$^+$X$^-$. Here, in the formula, R1, R2, and R3 are hydrogen atoms or hydrocarbon groups independent from each other, and X$^-$ is halogen element ion, for example, such as fluoride, chloride, brome, iodine, or the like or an inorganic or organic ion. In addition, examples of the polar functional group include —OH, —SH, —CN, an epoxy group, and the like. The amount of these polar functional groups introduced into the binding agent is preferably 10$^{-1}$ to 10$^{-8}$ mol/g and more preferably 10$^{-2}$ to 10$^{-6}$ mol/g.

(Lubricant)

The magnetic layer 13 described above may contain lubricant. For example, the lubricant described above may be one or two or more selected from fatty acids and/or fatty acids ester and, more preferably, may include both fatty acids and fatty acids ester. The fatty acid described above may be preferably a compound represented by General Formula (1) or (2) represented below. For example, as the fatty acid described above, one of a compound represented by General Formula (1) represented below and a compound represented by General Formula (2) may be included, or both thereof may be included.

In addition, the fatty acid ester described above may be preferably a compound represented by General Formula (3) or (4) represented below. For example, as the fatty acid ester described above, one of a compound represented by General Formula (3) represented below and a compound represented by a General Formula (4) may be included, and both thereof may be included.

In accordance with the lubricant described above including any one or both of the compound represented by General Formula (1) and the compound represented by General Formula (2) and any one or both of the compound represented by General Formula (3) and the compound represented by General Formula (4), an increase in the dynamic friction coefficient according to repetitive recording or reproduction of the magnetic recording medium can be inhibited.

$$CH_3(CH_2)_kCOOH \quad (1)$$

(here, in General Formula (1) described above, k is an integer selected from the range of 14 or more and 22 or less, and more preferably selected from the range of 14 or more and 18 or less.)

$$CH_3(CH_2)_nCH=CH(CH_2)_mCOOH \quad (2)$$

(here, in General Formula (2) described above, a sum of n and m is an integer selected from the range of 12 or more and 20 or less, and more preferably selected from the range of 14 or more and 18 or less)

$$CH_3(CH_2)_pCOO(CH_2)_qCH_3 \quad (3)$$

(here, in General Formula (3), p is an integer selected from the range of 14 or more and 22 or less, and more preferably selected from the range of 14 or more and 18 or less, and q is an integer selected from the range of 2 or more and 5 or less, and more preferably selected from the range of 2 or more and 4 or less)

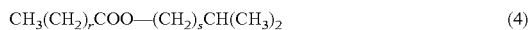

$$CH_3(CH_2)_rCOO-(CH_2)_sCH(CH_3)_2 \quad (4)$$

(here, in General Formula (4), r is an integer selected from the range of 14 or more and 22 or less, and s is an integer selected from the range of 1 or more and 3 or less)

Examples of the lubricant described above include ester with any one of single-basic fatty acid of carbon numbers 10 to 24 and monohydric to hexa-hydric alcohol of carbon numbers 2 to 12, mixed ester thereof, difatty acid ester, tri-fatty acid ester, and the like. Specific examples of the lubricant described include lauric acid, myristic acid, palmitic acid, stearic acid, behenic acid, oleic acid, linolic acid, linoleic acid, elaidic acid, butyl stearate, stearic acid pentyl, heptyl stearate, octyl stearate, iso-octyl stearate, octyl myristic acid, and the like.

(Antistatic Agent)

Examples of the antistatic agent include carbon black, a natural surfactant, nonionic surfactant, cationic surfactant, and the like.

(Abrasive)

Examples of abrasives include a alumina with an α transformation rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-shaped α-iron oxides obtained by dehydrating and annealing raw materials of magnetic iron oxide, and those obtained by performing a surface treatment on the above materials with aluminum and/or silica as necessary.

(Curing Agent)

The curing agent, for example, may be polyisocyanates and the like. Examples of polyisocyanates include aromatic polyisocyanates such as adducts of tolylene diisocyanate (TDI) and an active hydrogen compound, and aliphatic polyisocyanates such as adducts of hexamethylene diisocyanate (HMDI) and an active hydrogen compound. The weight-average molecular weight of these polyisocyanates is preferably in a range of 100 to 4500.

(Antirust Agent)

Examples of antirust agents include phenols, naphthols, quinones, heterocyclic compounds containing nitrogen atoms, heterocyclic compounds containing oxygen atoms, heterocyclic compounds containing sulfur atoms, and the like.

(Non-Magnetic Reinforcing Particles)

Examples of non-magnetic reinforcing particles include aluminum oxide (α, β or γ alumina), chromium oxide, silicon oxide, diamond, garnet, emery, boron nitride, titanium carbide, silicon carbide, titanium carbide, titanium oxide (rutile type or anatase type titanium oxide), and the like.

(Underlayer)

The underlayer 12 is a non-magnetic layer containing a non-magnetic powder and a binding agent. The underlayer 12 may further contain at least one additive among lubricant, an antistatic agent, a curing agent, an antirust agent, and the like, as necessary.

An average thickness of the underlayer 12 is 1.50 μm or less, preferably 1.35 μm or less, more preferably 1.30 μm or less, further preferably 1.20 μm or less, and particularly preferably 1.10 μm or less, 0.80 μm or less, 0.70 μm or less, or 0.60 μm or less. In accordance with the average thickness of the underlayer being in this numerical range, resolution can be improved. The average thickness of the underlayer 12 can be acquired in a manner similar to that of the average thickness $t_m$ of the magnetic layer 13. Here, the magnification of the TEM image is appropriately adjusted according to the thickness of the underlayer 12.

In a preferred embodiment of the present technology, the underlayer 12 is disposed between the magnetic layer 13 and the base layer 11.

(Non-Magnetic Powder)

For example, the non-magnetic powder includes at least one of an inorganic particle powder or organic particle powder. In addition, the non-magnetic powder may include a carbon powder such as a carbon black or the like. Here, one type of non-magnetic powder may be used alone, or two or more types of non-magnetic powders may be used in combination. Examples of inorganic particles include metals, metal oxides, metal carbonates, metal sulfates, metal nitrides, metal carbides, and metal sulfides, and the like. Examples of shapes of non-magnetic powders include various shapes such as a needle shape, a spherical shape, a cube shape, a plate shape, and the like but are not limited to such shapes.

(Binding Agent)

The description relating to the binding agent included in the magnetic layer 13 described above can also be applied to the binding agent included in the underlayer 12.

(Additive)

The descriptions relating to the lubricant, the antistatic agent, the curing agent, and the antirust agent included in the magnetic layer 13 described above can be also applied to the lubricant, the antistatic agent, the curing agent, and the antirust agent included in the underlayer 12.

(Back Layer)

The back layer 14 may contain a binding agent and a non-magnetic powder. The back layer 14 may further contain at least one additive among a lubricant, a curing agent, an antistatic agent, and the like, as necessary. The descriptions relating to the binding agent and the non-magnetic powder included in the underlayer 12 described above can also be applied to the binding agent and the non-magnetic powder included in the back layer.

The average particle size of the non-magnetic powder is preferably 10 nm or more and 150 nm or less, and more preferably 15 nm or more and 110 nm or less. The average particle size of the non-magnetic powder is obtained in the same manner as the above-described average particle size of the magnetic powder. The non-magnetic powder may contain a non-magnetic powder having a particle size distribution of 2 or more.

An average thickness of the back layer 14 (also referred to as an "average thickness $t_b$" or "$t_b$" in this specification) is preferably 0.6 μm or less. In accordance with the average thickness $t_b$ of the back layer 14 being in the range described above, even when the average thickness of the magnetic recording medium 10 is, for example, 5.90 μm or less, the thickness of the underlayer 12 and the base layer 11 can be maintained to be large, and, in accordance therewith, running stability of the magnetic recording medium 10 inside a recording and reproducing device can be maintained. A lower limit value of the average thickness $t_b$ of the back layer 14 is not particularly limited and, for example, is 0.2 μm or more.

In a preferred embodiment of the present technology, the back layer 14 is disposed on a face on a side opposite to face on a side on which the magnetic layer 13 is disposed out of two faces of the base layer 11.

The average thickness $t_b$ of the back layer 14 is obtained as follows. First, an average thickness $t_T$ of the magnetic recording medium 10 is measured. A method for measuring the average thickness $t_T$ is as described below in this specification. Subsequently, the back layer 14 of the sample is removed using a solvent such as methyl ketone (MEK), dilute hydrochloric acid, or the like. Next, by using a laser hologram gauge (LGH-110C) manufactured by Mitutoyo Inc, the thickness of the sample is measured at positions of five or more points, and, by simply averaging (taking an arithmetic mean of) such measured values, an average value $t_b$[μm] is calculated. Then, the average thickness $t_b$ [μm] of the back layer 14 is obtained from the following formula. Here, the measurement positions are randomly selected from the sample. $t_b$[μm]=$t_T$[μm]-$t_b$[μm]

(Average Thickness $t_T$ of Magnetic Recording Medium)

The average thickness of the magnetic recording medium 10 (also referred to as an "average thickness $t_T$" or "$t_T$" in this specification) is preferably 5.90 μm or less, more preferably 5.60 μm or less, further more preferably 5.30 μm or less, and particularly preferably 5.20 or less or 5.10 μm or less. In accordance with the average thickness $t_T$ of the magnetic recording medium 10 being in the numerical range described above (for example, in accordance with $t_T$≤5.90 μm), a recording capacity that can be recorded inside one data cartridge can be raised. A lower limit value of the average thickness $t_T$ of the magnetic recording medium 10 is not particularly limited and, for example, 3.50 μm≤$t_T$.

The average thickness $t_T$ of the magnetic recording medium 10 can be acquired as below. First, a magnetic recording medium 10 of a width of ½ inches is prepared and cut into a length of 250 mm, whereby a sample is manufactured. Next, by using a laser hologram gauge (LGH-110C) manufactured by Mitutoyo Corp. as a measurement device, a thickness of the sample is measured at positions of five or more points, and, by simply averaging (taking an arithmetic mean of) such measured values, the average value $t_T$[μm] is calculated. Here, the measurement positions are randomly selected from the sample.

(2) Physical Property of Magnetic Recording Medium

In a bearing curve generated on the basis of height data of a magnetic layer-side surface acquired using an atomic force microscope, a core part level difference Rk of the magnetic recording medium 10 is 5.5 nm or less, preferably 5.2 nm or less, more preferably 5.0 nm or less, and further more preferably 4.7 nm or less. In accordance with this core part level difference Rk being in this numerical range, resolution can be improved. For example, the core part level difference Rk may be 3.6 nm or more or 3.8 nm or more.

The core part level difference Rk is acquired from the bearing curve generated on the basis of height data of the magnetic layer-side surface of the magnetic recording medium 10 acquired using an atomic force microscope. Hereinafter, first, a method for generating the bearing curve will be described, and then a method for calculating the core part level difference Rk will be described.

(Bearing Curve)

The bearing curve described above is generated as below. First, an uneven shape of the magnetic layer-side surface of the magnetic recording medium 10 is measured using an atomic force microscope (AFM). This measurement is performed at 256×256 (65,536) measurement points in the range of 40 μm×40 μm.

Hereinafter, an AFM that is appropriate for measurement will be represented.

AFM: Dimension 3100 manufactured by Digital Instruments Co.

Cantilever: NCH-10T manufactured by NanoWorld Inc.

Hereinafter, measurement conditions of the AFM will be represented.

Measurement area: 40 μm×40 μm
Resolution: 256×256
Scanning direction of probe of AFM: MD direction (longitudinal direction) of magnetic tape
Measurement mode: tapping mode
Scan ratio: 1 Hz Next, data acquired using this measurement is displayed using a binary editor (Binary Editor Bz), and, a value of Sens.Zscan [nm/V], a value of Z_Scale [V], and a measurement value $pAFM_{a,b}$ of each measurement point are extracted from this data. The acquired values of Sens.Zscan and Z_Scale are read into program LabVIEW produced by National Instruments Inc, the matrix is inverted, and surplus data corresponding to 2 bits is deleted. A value acquired from LabVIEW is read into a calculation program. By using this calculation program, values of coordinates used for drawing a bearing curve can be acquired. The flow of calculation in this calculation program is as below.

First, a height $AFM_{a,b}$ of each measurement point is acquired using the following equation.

$$AFM_{a,b}[\text{nm}] = \frac{pAFM_{a,b} \times Sens.Zscan[\text{nm}/V] \times Z\_Scale[V]}{65536} \quad \text{[Math. 2]}$$

(In the equation represented above, $AFM_{a,b}$ is a height of each measurement point, $pAFM_{a,b}$ is a measurement value of each measurement point, and each of a and b is an integer independently selected from a range that is 1 or more and 256 or less.)

In accordance with the values of a and b in the equation represented above, a position of each measurement point in the range of 40 μm×40 μm described above is specified.

In the magnetic recording medium of the present technology, "height data of the magnetic layer-side surface acquired using an atomic force microscope" described above (hereinafter, also referred to as "height data of the magnetic layer-side surface") represents a height $AFM_{a,b}$ of each measurement point acquired using the equation represented above.

Next, a bearing curve is generated on the basis of the height data of the magnetic layer-side surface described above. More specifically, first, an average (an average height $H_a$) of heights $AFM_{a,b}$ of measurement points acquired using the equation represented above is calculated. Next, by subtracting the value of the average height $H_a$ from the value of the height $AFM_{a,b}$ of each measurement point, a height difference $H_d$ of each measurement point is calculated. In other words, the height difference $H_d$ of each measurement point is acquired using the following equation.

Value of $X$ coordinate [%] =

Data Number/Number of pieces of all data×100

Height differences $H_d$ of measurement points are aligned as a one-dimensional array. This one-dimensional array is sorted in order of largest to smallest values (a descending order). $H_d$ of the one-dimensional array after this sorting is a value of a Y coordinate of each point for drawing a bearing curve. In other words, the value of the Y coordinate of the bearing curve is the height difference $H_d$ described above. In this specification, this height difference $H_d$ will be referred to as a height in the bearing curve.

Next, the value of an X coordinate of each point for drawing the bearing curve is acquired using the following equation.

Height difference $H_d$ [nm] of each measurement point =

(Height $AFM_{a,b}$ of each measurement point)−(Average height $H_a$)

(In the equation represented above, the data number is an element number of the one-dimensional array after sorting in the descending order, and the number of pieces of all the data is the number of all the measurement points)

In this way described above, by using the calculation program described above, the value of the X coordinate and the value of the Y coordinate are acquired. FIG. 6 illustrates an example of Data Number, the value of the X coordinate and the value of the Y coordinate acquired using this calculation program.

Finally, by plotting the value of the X coordinate and the value of the Y coordinate at XY coordinates, whereby a bearing curve is generated. In this XY coordinates, an X axis represents an area ratio, and a Y axis represents a height (more specifically, a height difference $H_d$). This area ratio is an accumulated ratio of the height (height difference $H_d$). In other words, this area ratio is acquired by accumulating frequencies in order of highest to lowest heights (height differences $H_d$) and representing it as a percentage with the number (65, 536) of all the measurement points measured by the AFM set as 100. For example, in a case in which the X coordinate of a point P on the bearing curve is 10(%), and the Y coordinate thereof is 2.50 (nm), the number of measurement points of which heights (height differences $H_d$) are 2.50 nm or more is 10% of the number of all the measurement points.

(Core Part Level Difference Rk)

Figure 7:
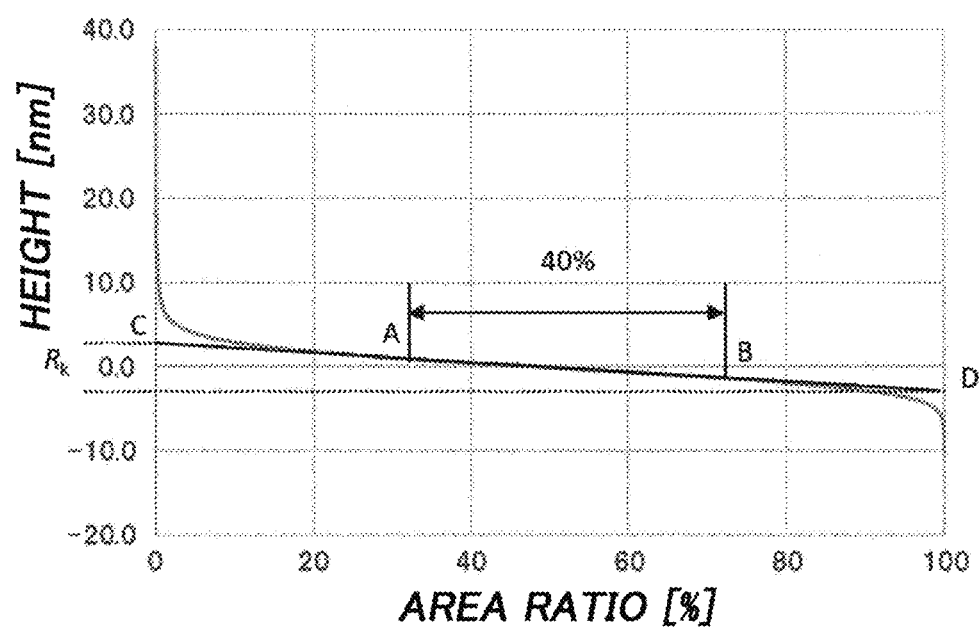
FIG. 7 is a graph illustrating an example of a bearing curve.

A method for calculating the core part level difference Rk will be described with reference to FIG. 7. FIG. 7 is a graph illustrating an example of the bearing curve. First, among straight lines passing through two points (point A, point B) at which a difference of the area ratio is 40% as points on the bearing curve, a straight line having the smallest inclination is acquired. Next, an intersection between the straight line having the smallest inclination and an area ratio of 0% is set as point C. An intersection between the straight line having the smallest inclination and an area ratio of 100% is set as point D. Finally, an absolute value of a difference between the Y coordinate of point C and the Y coordinate of point D is calculated. The absolute value of this difference is the core part level difference Rk.

(Height at Specific Area Ratio in Bearing Curve)

A height at an area ratio of 10.00% of the bearing curve of the magnetic recording medium 10 is preferably 2.80 nm or less, more preferably 2.50 nm or less, and further more preferably 2.30 nm or less. The height at the area ratio of this 10.00% being in this numerical range can contribute to improvement of resolution. For example, the height at the area ratio of this 10.00% may be 1.50 nm or more or 1.80 nm or more.

The height H at an area ratio of 20.00% in the bearing curve of the magnetic recording medium 10 is preferably 1.70 nm or less, more preferably 1.60 nm or less, and further more preferably 1.50 nm or less. The height at the area ratio of this 20.00% being in this numerical range can contribute to improvement of resolution. For example, the height at the area ratio of this 20.00% may be 0.90 nm or more or 1.10 nm or more.

The height H at an area ratio of 30.00% in the bearing curve of the magnetic recording medium 10 is preferably 1.00 nm or less and more preferably 0.90 nm or less. The height at the area ratio of this 30.00% being in this numerical range can contribute to improvement of resolution. For example, the height at the area ratio of this 30.00% may be 0.40 nm or more or 0.60 nm or more.

The height at an area ratio of 40.00% in the bearing curve of the magnetic recording medium 10 is preferably 0.50 nm or less and more preferably 0.40 nm or less. The height at the area ratio of this 40.00% being in this numerical range can contribute to improvement of resolution. For example, the height at the area ratio of this 40.00% may be 0.10 nm or more or 0.20 nm or more.

The inventor of the present technology has discovered that the height at each of the area ratios of 10.00%, 20.00%, 30.00%, and 40.00% in the bearing curve has a high correlation with resolution. The inventor of the present technology has further performed a review and, as described above, has discovered that, in accordance with the height at a specific area ratio being a specific numerical value or less, a magnetic recording medium exhibiting higher resolution can be acquired. The reason for this is assumed that a decrease in the value of the height at a specific area ratio contributes to reduction of unevenness of the magnetic layer-side surface of the magnetic recording medium.

(Power Spectrum Density)

A power spectrum density (PSD) of the magnetic layer up to a spatial wavelength of 5 μm can be used as an index of undulation of the magnetic layer surface. In the magnetic recording medium 10, the power spectrum density of the magnetic layer 13 up to a spatial wavelength of 5 μm is preferably 3.6 nm³ or less, more preferably 3.3 nm³ or less, further more preferably 3.0 nm³ or less, and particularly preferably 2.6 nm³ or less. This power spectrum density being in this numerical range can contribute to improvement of resolution. The reason for this is assumed that, in accordance with the power spectrum density described above being in the numerical range described above (for example, 3.6 nm³ or less), the spacing can be decreased.

The power spectrum density of the magnetic layer 13 up to a spatial wavelength of 5 μm is measured as below. First, a magnetic recording medium 10 of a width of 12.7 mm is cut into a length of 10 mm, and a sample of a rectangular shape of 12.7 mm×10 mm is produced. In addition, a sample of the same shape is produced at two positions for every 10 m, and a total of three samples are acquired. Each sample is fixed on a slide glass using a carbon tape or the like. The surface is observed using an atomic force microscope (AFM), and two-dimensional (2D) surface profile data is acquired.

Hereinafter, an AFM that is appropriate for measurement will be represented.

AFM: Dimension 3100 manufactured by Digital Instruments Co.

Cantilever: NCH-10T manufactured by NanoWorld Inc.

Hereinafter, measurement conditions of the AFM will be represented.

Measurement area: 40 μm×40 μm

Resolution: 256×256

Scanning direction of probe of AFM: MD direction (longitudinal direction) of magnetic tape Measurement mode: tapping mode Scan ratio: 1 Hz Next, for 2D surface profile data acquired using the AFM, a filter process described above is performed.

Flatten: 2nd order

Planefit: 3rd order in an MD direction and a TD direction (width direction)

Next, in the MD direction of 2D surface profile data after a filter process, Fast Fourier Transform (FFT) is performed for each of 256 lines, and 256 PSDs are acquired. Next, by averaging the acquired 256 PSDs of the MD direction for each wavelength, and one averaged PSD of the MD direction (hereinafter, referred to as "$PSD_{MD}$" or "$PSD(k)_{MD}$") is acquired. In the averaging of PSDs of the MD direction, the following equation is used.

$$PSD(k)_{MD} = \left( \frac{2d}{N} \left| \sum_{n=0}^{N-1} Z(n) \cdot e^{\left( \frac{2\pi i k n}{N} \right)} \right|^2 \right)_{average}$$

[Math. 3]

PSD: Power spectrum density ($nm^3$)

z(n): surface profile data (nm) at the n-th point d: resolution (nm)=L/N

L: Measurement range (40 μm) in X-axis direction (or Y-axis direction)

N: Number of points in X-axis direction (256 points)

i: Imaginary unit e: Napier number average: Averaging operation in Y-axis direction (or X-axis direction)

n: Variable (0 to N−1)

k: Wave number (0 to N−1)

In addition, the X-axis direction corresponds to the MD direction (the longitudinal direction).

Among PSD values for each wavelength acquired up to here, PSD values of wavelengths of 5 μm or less are summed. A simple average (an arithmetic mean) of the summed value of three samples is employed as a power spectrum density of the magnetic layer 13 up to the spatial wavelength of 5 μm.

(3) Method for Manufacturing Magnetic Recording Medium

Next, a method for manufacturing the magnetic recording medium 10 having the configuration described above will be described. First, by kneading and dispersing non-magnetic powders, a binding agent, and the like in a solvent, an underlayer forming coating material is prepared. Next, by kneading and dispersing magnetic powders, a binding agent, and the like in a solvent, a magnetic layer forming coating material is prepared. In preparation of the magnetic layer forming coating material and the underlayer forming coating material, for example, a solvent, a dispersion device, and a kneading device described below can be used.

Examples of solvents used to prepare the above-described coating materials include ketone-based solvents such as acetone, methyl ethyl ketone, methyl isobutyl ketone and cyclohexanone, alcohol-based solvents such as methanol, ethanol and propanol, ester-based solvents such as methyl acetate, ethyl acetate, butyl acetate, propyl acetate, ethyl lactate and ethylene glycol acetate, ether-based solvents such as diethylene glycol dimethyl ether, 2-ethoxyethanol, tetrahydrofuran and dioxane, aromatic hydrocarbon-based solvents such as benzene, toluene and xylene, halogenated hydrocarbon-based solvents such as methylene chloride, ethylene chloride, carbon tetrachloride, chloroform, and chlorobenzene, and the like. These may be used alone or mixed appropriately.

As the kneading device used in preparation of the coating material described above, for example, a kneading device such as a continuous biaxial kneader, a continuous biaxial kneader capable of performing dilution in multiple stages, a kneader, a pressurizing kneader, a roll kneader, or the like can be used and is not particularly limited to such devices. In addition, as the dispersion device used in preparation of the coating material described above, for example, a dispersion device such as a roll mill, a ball mill, a horizontal sand mill, a vertical sand mill, a spike mill, a pin mill, a tower mill, a pearl mill (for example, a "DCP mill" manufactured by Erich), a homogenizer, an ultrasonic disperser, or the like can be used and is not particularly limited to such devices.

Next, by coating one principal face of the base layer 11 with the underlayer forming coating material and drying the material, the underlayer 12 is formed. Subsequently, by coating this underlayer 12 with the magnetic layer forming coating material and drying the material, the magnetic layer 13 is formed on the underlayer 12. In addition, at the time of drying, for example, by using a solenoid coil, magnetic powders are magnetic field oriented in a thickness direction of the base layer 11. In addition, at the time of drying, for example, by using a solenoid coil, after magnetic powders are magnetic field oriented in the running direction (a longitudinal direction) of the base layer 11, the magnetic powders may be magnetic field oriented in the thickness direction of the base layer 11. By performing such a magnetic-field orientation process, a degree of vertical orientation of magnetic powders can be improved. After forming the magnetic layer 13, a back layer 14 is formed on the other principal face of the base layer 11. In accordance with this, the magnetic recording medium 10 can be acquired.

Thereafter, the acquired magnetic recording medium 10 is directly wound around a large-diameter core, and a curing process is performed. Finally, after calender processing is performed for the magnetic recording medium 10, the magnetic recording medium 10 is cut into a predetermined width (for example, a width of ½ inches). In this way described above, the magnetic recording medium 10 having a thin and long shape that is a target can be acquired.

(4) Recording and Reproducing Device (Configuration of Recording and Reproducing Device)

Next, an example of the configuration of a recording and reproducing device 30 performing recording and reproducing for the magnetic recording medium 10 having the configuration described above will be described with reference to FIG. 8.

The recording and reproducing device 30 has a configuration capable of adjusting tension applied to the longitudinal direction of the magnetic recording medium 10. In addition, the recording and reproducing device 30 has a configuration being able to load a magnetic recording cartridge 10A. Here, for the convenience of description, although a case in which the recording and reproducing device 30 has a configuration in which one magnetic recording cartridge 10A can be loaded will be described, the recording and reproducing device 30 may have a configuration in which a plurality of magnetic recording cartridges 10A can be loaded.

The recording and reproducing device 30 is connected to information processing devices such as a server 41, a personal computer (hereinafter, referred to as a "PC") 42, and the like through a network 43 and is configured to be able to record data supplied from such information processing devices in the magnetic recording cartridge 10A. A shortest recording wavelength of the recording and reproducing device 30 is preferably 100 nm or less, more preferably 75 nm or less, further more preferably 60 nm or less, and particularly preferably 50 nm or less.

Figure 8:
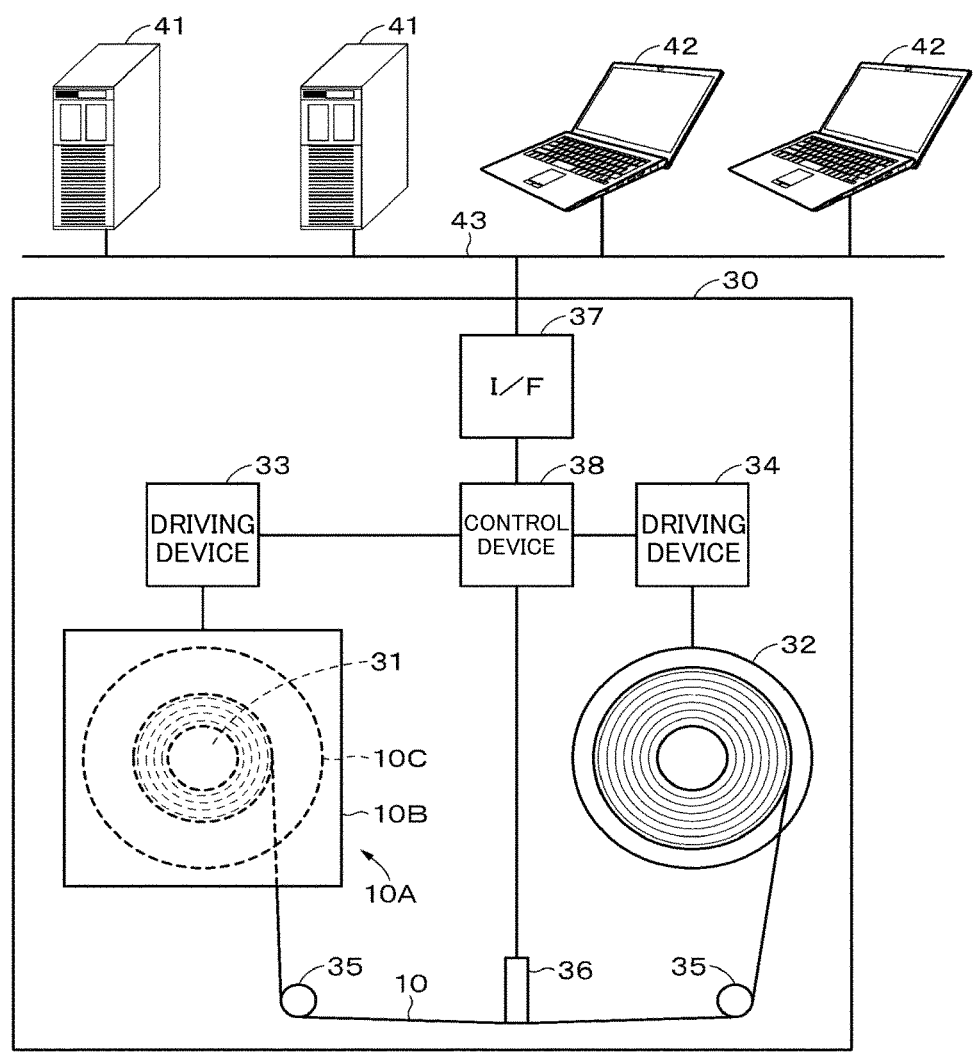
FIG. 8 is a schematic view of a recording and reproducing device.

As illustrated in FIG. 8, the recording and reproducing device 30 includes a spindle 31, a recording and reproducing device-side reel 32, a spindle driving device 33, a reel driving device 34, a plurality of guide rollers 35, a head unit 36, a communication interface (hereinafter, referred to as I/F) 37, and a control device 38.

The spindle 31 is configured to be able to load a magnetic recording cartridge 10A. The magnetic recording cartridge 10A is in compliance with Linear Tape Open (LTO) standards and houses a single reel 10C around which a magnetic recording medium 10 is wound to be rotatable in a cartridge casing 10B. In the magnetic recording medium 10, as a servo signal, a servo pattern having a truncated chevron shape is recorded in advance. The reel 32 is configured to be able to fix a tip end of the magnetic recording medium 10 drawn out from the magnetic recording cartridge 10A.

The spindle driving device 33 is a device that drives the spindle 31 to rotate. The reel driving device 34 is a device that drives the reel 32 to rotate. In recording or reproducing data for the magnetic recording medium 10, the spindle driving device 33 and the reel driving device 34 drive the spindle 31 and the reel 32 to rotate, thereby running the magnetic recording medium 10. The guide roller 35 is a roller used for guiding running of the magnetic recording medium 10.

The head unit 36 includes a plurality of recording heads used for recording data signals in the magnetic recording medium 10, a plurality of reproduction heads used for reproducing data signals recorded in the magnetic recording medium 10, and a plurality of servo heads used for reproducing servo signals recorded in the magnetic recording medium 10. As the recording head, for example, although a ring-type head can be used, the type of the recording head is not limited thereto.

The communication I/F 37 is used for communicating with information processing devices such as the server 41, the PC 42, and the like and is connected to the network 43.

The control device 38 controls the entire recording and reproducing device 30. For example, in response to a request from an information processing device such as the server 41, the PC 42, or the like, the control device 38 records a data signal supplied from the information processing device in the magnetic recording medium 10 using the head unit 36. In addition, in response to a request from an information processing device such as the server 41, the PC 42, or the like, the control device 38 reproduces a data signal recorded in the magnetic recording medium 10 using the head unit 36 and supplies the data signal to the information processing device.

(Operation of Recording and Reproducing Device)

Next, an operation of the recording and reproducing device 30 having the configuration described above will be described.

First, the magnetic recording cartridge 10A is mounted in the recording and reproducing device 30, a tip end of the magnetic recording medium 10 is extracted and is transferred to the reel 32 through a plurality of guide rollers 35 and the head unit 36, and the tip end of the magnetic recording medium 10 is mounted in the reel 32.

Next, when an operation unit not illustrated in the drawing is operated, the spindle driving device 33 and the reel driving device 34 are driven in accordance with control of the control device 38, and the spindle 31 and the reel 32 is rotated in the same direction such that the magnetic recording medium 10 runs from the reel 10C to the reel 32. In accordance with this, while the magnetic recording medium 10 is wound around the reel 32, recording of information in the magnetic recording medium 10 or reproduction of information recorded in the magnetic recording medium 10 is performed using the head unit 36.

In addition, in a case in which the magnetic recording medium 10 is wound around the reel 10C, the spindle 31 and the reel 32 are driven to rotate in a direction opposite to that described above, whereby the magnetic recording medium 10 runs from the reel 32 to the reel 10C. Also at the time of this winding, recording of information in the magnetic recording medium 10 or reproduction of information recorded in the magnetic recording medium 10 is performed using the head unit 36.

(5) Cartridge (Configuration of Cartridge)

The present technology also provides a magnetic recording cartridge including the magnetic recording medium of the present technology (also referred to as a tape cartridge). Inside this magnetic recording cartridge, for example, the magnetic recording medium described above may be wound around a reel. This magnetic recording cartridge, for example, may include a communication unit that communicates with a recording and reproducing device, a storage unit, and a control unit that stores information received from the recording and reproducing device described above through the communication unit in the storage unit, reads information from the storage unit described above in response to a request from the recording and reproducing device described above, and transmits the read information to the recording and reproducing device through the communication unit. The information described above may include adjustment information used for adjusting tension applied to the longitudinal direction of the magnetic recording medium. The adjustment information described above, for example, may include dimension information of the width direction at a plurality of positions in the longitudinal direction of the magnetic recording medium described above. This dimension information of the width direction may be dimension information at the time of manufacturing a magnetic recording medium (in an initial period after manufacturing) described below in [Configuration of cartridge memory] and/or dimension information acquired in a recording and/or reproducing process for this magnetic recording medium.

An example of the configuration of the cartridge 10A including the magnetic recording medium 10 having the configuration described above will be described with reference to FIG. 9.

Figure 9:
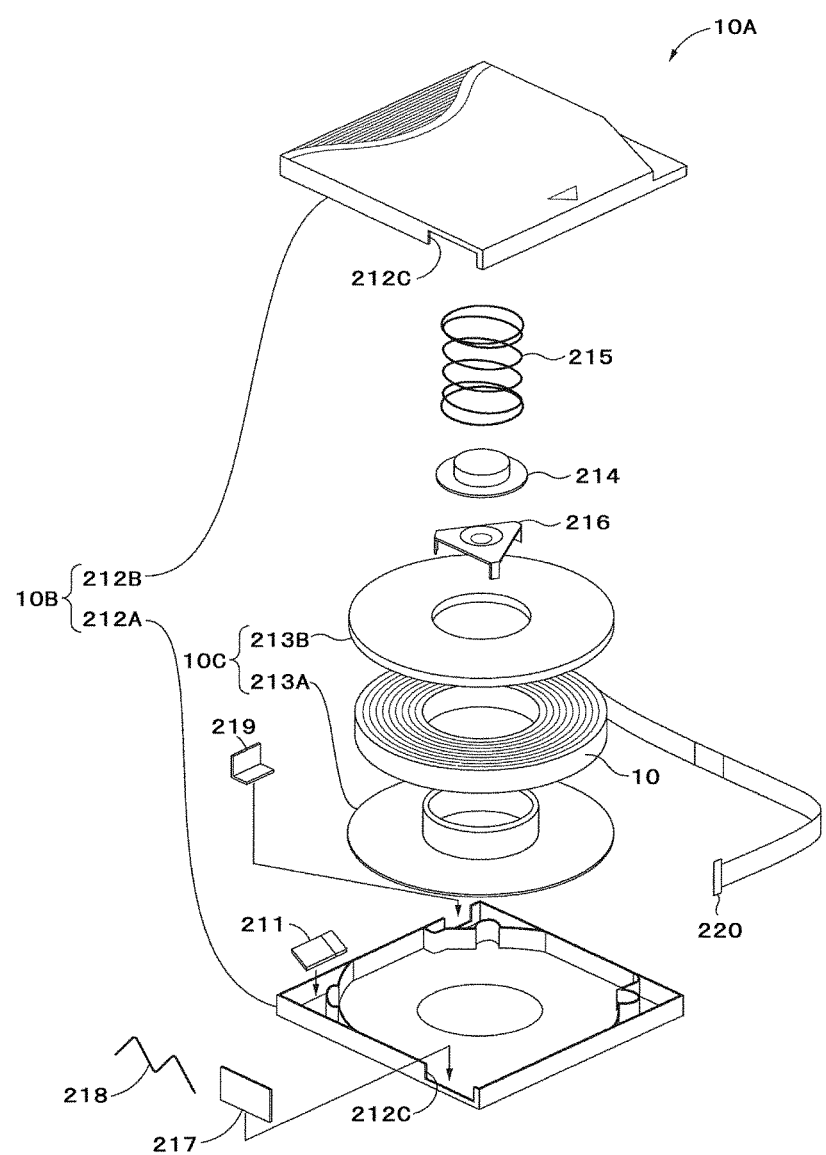
FIG. 9 is an exploded perspective view illustrating an example of a configuration of a cartridge.

FIG. 9 is an exploded perspective view illustrating an example of the configuration of the cartridge 10A. The cartridge 10A is a magnetic recording medium cartridge compliant with Linear Tape-Open (LTO) standards and, inside the cartridge casing 10B composed of a lower shell 212A and an upper shell 212B, includes a reel 10C around which a magnetic tape (a magnetic recording medium of a tape form) 10 is wound, a reel lock 214 and a reel spring 215 used for locking rotation of the reel 10C, a spider 216 used for releasing a locked state of the reel 10C, a slide door 217 opening/closing a tape drawing-out port 212C disposed in the cartridge casing 10B over the lower shell 212A and the upper shell 212B, a door spring 218 that biases the slide door 217 to a closing position of the tape drawing-out port 212C, a write protection 219 used for preventing erroneous deletion, and a cartridge memory 211. The reel 10C has an approximate disc shape having an opening at its center and is composed of a reel hub 213A formed from a hard material such as plastic and a flange 213B. A leader pin 220 is disposed at one end of the magnetic tape 10.

The cartridge memory 211 is disposed near one corner of the cartridge 10A. In a state in which the cartridge 10A is loaded in the recording and reproducing device 30, the cartridge memory 211 is configured to face a reader/writer (not illustrated in the drawing) of the recording and reproducing device 30. The cartridge memory 211 communicates with the recording and reproducing device 30, more specifically a reader/writer (not illustrated in the drawing) using radio communication standards compliant with the LTO standards.

(Configuration of Cartridge Memory)

An example of the configuration of the cartridge memory 211 will be described with reference to FIG. 10.

Figure 10:
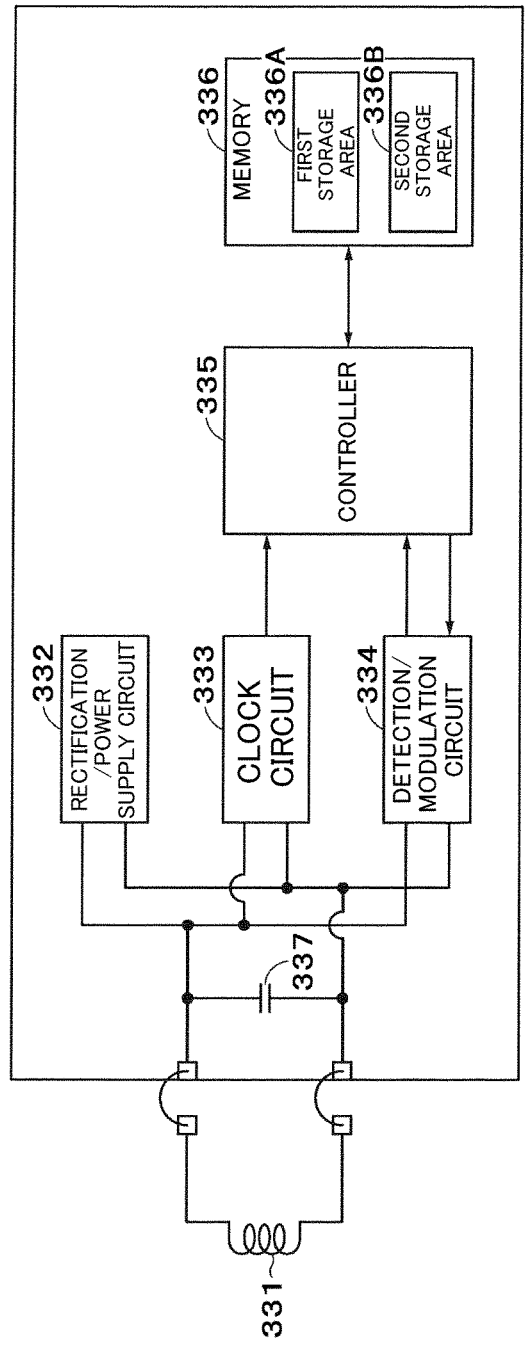
FIG. 10 is a block diagram illustrating an example of a configuration of a cartridge memory.

FIG. 10 is a block diagram illustrating an example of the configuration of the cartridge memory 211. The cartridge memory 211 includes an antenna coil (communication unit) 331 that communicates with a reader/writer (not illustrated in the drawing) using prescribed communication standards, a rectification/power supply circuit 332 that generates a power source by generating and rectifying electric power using an induced electromotive force from electric waves received using the antenna coil 331, a clock circuit 333 that generates a clock using the same induced electromotive force from electric waves received using the antenna coil 331, a detection/modulation circuit 334 that performs detection of electric waves received using the antenna coil 331 and modulation of a signal transmitted using the antenna coil 331, a controller (control unit) 335 composed of a logic circuit used for determining a command and data from a digital signal extracted by the detection/modulation circuit 334 and processing them and the like, and a memory (storage unit) 336 that stores information. In addition, the cartridge memory 211 includes a capacitor 337 which is connected to the antenna coil 331 in parallel, and a resonance circuit is constituted by the antenna coil 331 and the capacitor 337.

The memory 336 stores information relating to the cartridge 10A and the like. The memory 336 is a non-volatile memory (NVM). A storage capacity of the memory 336 is preferably approximately 32 KB or more. For example, in a case in which the cartridge 10A is in compliance with LTO-9 standards or LTO-10 standards, the memory 336 has a storage capacity of about 32 KB.

The memory 336 has a first storage area 336A and a second storage area 336B. The first storage area 336A corresponds to a storage area of a cartridge memory of LTO standards before LTO8 (hereinafter, referred to as a "conventional cartridge memory") and is an area for storing information compliant with LTO standards before LTO8. For example, the information compliant with the LTO standards before LTO8 is manufacturing information (for example, a serial number of the cartridge 10A and the like), a use history (for example, tape thread count, and the like), and the like.

The second storage area 336B corresponds to an extended storage area for the storage area of a conventional cartridge memory. The second storage area 336B is an area for storing additional information. Here, the additional information represents information relating to the cartridge 10A not defined in the LTO standards before LTO8. Examples of the additional information include tension adjustment information, management ledger data, index information, or thumbnail information of a moving image stored in the magnetic tape 10, and the like and are not limited to such data. The tension adjustment information includes a distance between servo bands adjacent to each other (a distance between servo patterns recorded in servo bands adjacent to each other) at the time of data recording for the magnetic tape 10. The distance between servo bands adjacent to each other is an example of width-related information relating to the width of the magnetic tape 10. Details of the distance between servo bands will be described below. In the following description, information stored in the first storage area 336A may be referred to as "first information", and information stored in the second storage area 336B may be referred to as "second information".

The memory 336 may include a plurality of banks. In such a case, the first storage area 336A is configured using some banks among a plurality of banks, and the second storage area 336B may be configured using the remaining banks. More specifically, for example, in a case in which the cartridge 10A is compliant with LTO-9 standards or LTO-10 standards, the memory 336 has two banks having a storage capacity of about 16 KB, the first storage area 336A may be configured using one out of the two banks, and the second storage area 336B may be configured using the other bank.

The antenna coil 331 induces an induced voltage by electromagnetic induction. The controller 335 communicates with the recording and reproducing device 30 using a prescribed communication standard through the antenna coil 331. More specifically, for example, mutual authentication, transmission/reception of a command, exchange or data, and the like are performed.

The controller 335 stores information received from the recording and reproducing device 30 through the antenna coil 331 in the memory 336. In response to a request from the recording and reproducing device 30, the controller 335 reads information from the memory 336 and transmits the read information to the recording and reproducing device 30 through the antenna coil 331.

(6) Effects

The magnetic recording medium 10 includes a magnetic layer and an underlayer, and, in a bearing curve generated on the basis of height data of a magnetic layer-side surface acquired using an atomic force microscope, the core part level difference Rk is 5.5 nm or less, and an average thickness of this underlayer is 1.50 μm or less. In accordance therewith, the magnetic recording medium 10 exhibits high resolution. For this reason, the magnetic recording medium 10 increases an output at the time of short-wavelength recording to be close to an output at the time of long-wavelength recording.

The resolution described above represents a reference tape ratio of a ratio of an output at the time of short-wavelength recording to an output at the time of long-wavelength recording. Hereinafter, a method for calculating this resolution will be described.

In measuring a reproduction output required for calculation of resolution, in addition to a magnetic recording medium evaluating resolution (hereinafter, also referred to as a trial tape), a reference tape and a device described below are used.

Reference tape: Master Standard Reference Tap (MSRT) or a tape of which resolution with MSRT can be known (a secondary standard reference tape or the like)

Device: LTO8 full height drive or a recording and reproduction system that can perform measurement under the following measurement conditions (a head and a tape speed represented below)

Head: LTO8

Tape speed: 2.8 [m/s]

First, by using a function generator, recording is performed at a frequency represented below for a trial tape and a reference tape.

Recording frequency: TRD1 (0.194 μm)→14.4 [MHz]
TRD3 (0.774 μm)→3.61 [MHz]

The recording current is assumed to have a current value at which an output becomes maximum.

Next, reproduction waveforms of the trial tape and the reference tape are read using an oscilloscope (for example, Lecroy 9354th). A peak-to-peak value is set as an output. Each of the trail tape and the reference tape is scanned 16 times or more, and acquired outputs are averaged (an arithmetic mean). In accordance with this, the output of each of the trial tape and the reference tape is calculated.

By using the following equation, resolution (Resolution) is acquired.

Resolution [%] =

(Output of $TRD1$ of trial tape/output of $TRD3$ of trial tape)/

(output of $TRD1$ of reference tape/output of $TRD3$ of reference tape) × 100

For example, the resolution of the magnetic recording medium of the present technology is 90.0% or more, preferably 92.0% or more, more preferably 94.0% or more, further more preferably 97.0% or more, and particularly preferably 100.0% or more. The resolution being in this numerical range contributes to approach of the output at the time of short-wave recording to the output at the time of long-wavelength recording.

(7) Modification Examples

Modification Example 1

Figure 11:
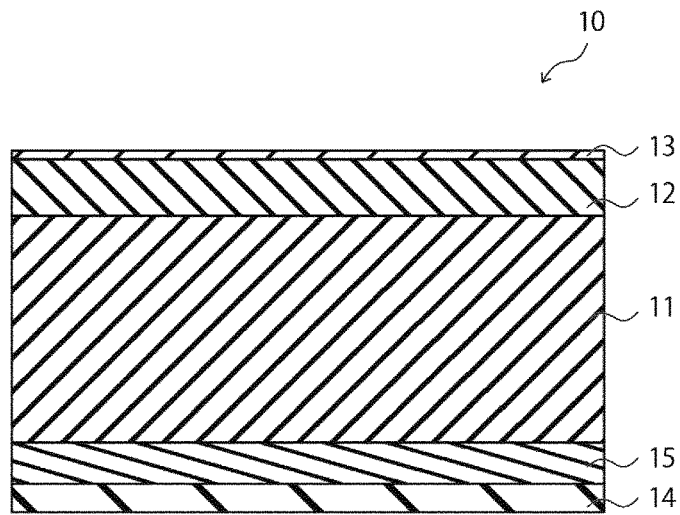
FIG. 11 is a schematic view illustrating a part of a cross-section of a magnetic recording medium of a modification example.

As illustrated in FIG. 11, the magnetic recording medium 10 may be configured to further include a barrier layer 15 disposed on at least one surface of the base layer 11. The barrier layer 15 is a layer that is used for inhibiting a dimensional change according to environments of the base layer 11. For example, as an example of a cause affecting the dimensional change, there is hygroscopicity of the base layer 11, and, by disposing the barrier layer 15, a penetration speed of moisture into the base layer 11 can decrease. The barrier layer 15, for example, includes metal or a metal oxide. As the metal, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, and Ta can be used. As the metal oxide, for example, a metal oxide containing one or two or more of the metals described above can be used. More specifically, for example, at least one of $Al_2O_3$, CuO, CoO, $SiO_2$, $Cr_2O_3$, $TiO_2$, $Ta_2O_5$, and $ZrO_2$ can be used. In addition, the barrier layer 15 may contain diamond-like carbon (DLC), diamond, or the like.

An average thickness of the barrier layer 15 is preferably 20 nm or more and 1000 nm or less and more preferably 50 nm or more and 1000 nm or less. The average thickness of the barrier layer 15 can be acquired in a manner similar to that for the average thickness of the magnetic layer 13. Here, the magnification of the TEM image is appropriate adjusted in accordance with the thickness of the barrier layer 15.

Modification Example 2

The magnetic recording medium 10 may be embedded in a library device. In other words, the present technology also provides a library device including at least one magnetic recording medium 10. This library device has a configuration to be able to adjust tension applied to the longitudinal direction of the magnetic recording medium 10 and may include a plurality of recording and reproducing devices 30 described above.

3. Working Example

Hereinafter, the present technology will be described below in detail with reference to examples, but the present technology is not limited to these examples.

Example 1

(Preparation Process of Magnetic Layer Forming Coating Material)

A magnetic layer forming coating material is prepared as follows. First, a first composition having the following mixture was kneaded by an extruder. Next, the kneaded first composition and a second composition having the following mixture were added to a stirring tank equipped with a disperser, and premixing was performed. Subsequently, sand mill mixing was further performed and filtering was performed to prepare a magnetic layer forming coating material.

(First Composition)

Magnetic powder (hexagonal ferrite having an M-type structure, Composition:

Ba-Ferrite, Average particle volume: 2500 $nm^3$): 100 parts by mass

Vinyl chloride resin (cyclohexanone solution of 30% by mass): 60 parts by mass (Polymerization degree 300, Mn=10000, containing $OS_3K$=0.07 mmol/g, secondary OH=0.3 mmol/g as a polar group)

Aluminum oxide powder: 5 parts by mass ($\alpha$-$Al_2O_3$, average particle diameter 90 nm)

Carbon black: 1.5 parts by mass (Trade name: Raven450)

(Second Composition)

Vinyl chloride resin: 1.1 parts by mass
(Resin solution: resin content 30% by mass, cyclohexanone 70% by mass)

n-butyl stearate: 2 parts by mass

Methyl ethyl ketone: 121.3 parts by mass

Toluene: 121.3 parts by mass

Cyclohexanone: 60.7 parts by mass

Finally, polyisocyanate (Trade name: Coronate L manufactured by Japan Polyurethan Corporation) of 2 parts by mass as a curing agent and stearic acid of 2 parts by mass were added to the magnetic layer forming coating material prepared as described above.

(Preparation Process of Underlayer Forming Coating Material)

An underlayer forming coating material was prepared as follows. First, a third composition having the following mixture was kneaded by an extruder. Next, the kneaded third composition and a fourth composition having the following mixture were added to a stirring tank equipped with a disperser, and premixing was performed. Subsequently, sand mill mixing was further performed and filtering was performed to prepare an underlayer forming coating material.

(Third Composition)

Needlelike iron oxide powder: 100 parts by mass ($\alpha$-$Fe_2O_3$, average major axis length of 0.11 μm)
Vinyl chloride resin: 55.6 parts by mass
(Resin solution: resin content 30% by mass, cyclohexanone 70% by mass)
Carbon black: 10 parts by mass
(average particle size of 20 nm)
anhydrous citric acid: 3 parts by mass (Fourth Composition)

Polyurethane resin UR8200 (manufactured by Toyo Boseki Kabushiki Kaisha, glass transition temperature Tg=73° C.): 18.5 parts by mass
n-butyl stearate: 2 parts by mass
Methyl ethyl ketone: 108.2 parts by mass
Toluene: 108.2 parts by mass
Cyclohexanone: 18.5 parts by mass Finally, stearic acid: 2 parts by mass was added to the underlayer forming coating material prepared as described above.

(Preparation Process of Back Layer Forming Coating Material)

The back layer forming coating material was manufactured as below. The following raw materials were mixed in a stirring tank equipped with a disperser and filtered to prepare a back layer forming coating material.

Carbon black (manufactured by Asahi Co, Trade name: #80): 100 parts by mass
Polyester polyurethane: 100 parts by mass
(Made by Nippon Polyurethane Industry Co., Ltd., trade name: N-2304)
Methyl ethyl ketone: 500 parts by mass
Toluene: 400 parts by mass
Cyclohexanone: 100 parts by mass
polyisocyanate (Trade name: Coronate L manufactured by Tosoh Corp.): 10 parts by mass (Film Forming Process)

By using the coating material manufactured as described above, a magnetic tape was manufactured as described below.

First, as a support body, a PEN film (a base layer) of an average thickness of 4.0 μm having a long form was prepared. Next, by coating one principal face of the PEN film with an underlayer forming coating material and drying the underlayer forming coating material, an underlayer of an average thickness of 1.30 μm was formed on the one principal face of the PEN film. Next, by coating the underlayer with a magnetic layer forming coating material and drying the magnetic layer forming coating material, a magnetic layer of an average thickness of 80 nm was formed on the underlayer. In addition, when the magnetic layer forming coating material was dried, the magnetic powder was magnetically oriented in the thickness direction of the PEN film by a solenoid coil.

Subsequently, by coating the other principal face of the PEN film on which the underlayer and the magnetic layer were formed with a back layer forming coating material and drying the back layer forming coating material, a back layer of an average thickness of 0.5 μm was formed. Then, a curing process was performed for the PEN film on which the underlayer, the magnetic layer, and the back layer were formed. At this time, the temperature was set to 60° C., and the time was set to 20 hours. Thereafter, a calender process was performed, and the magnetic layer surface was smoothed.

(Cutting Process)

The magnetic tape obtained as described above was cut to a width of ½ inches (12.65 mm). In accordance therewith, the magnetic tape having a long form and an average thickness of 5.88 μm was obtained.

(Servo Signal and Data Signal Writing)

A servo signal and a data signal were written in the magnetic tape of the long form acquired as described above as below. First, a servo signal was written into the magnetic tape using a servo writer, whereby five servo bands of which a servo band width $W_{SB}$ was 96 μm were formed. In addition, in accordance with writing of the servo signal, a column of a magnetic pattern having a truncated chevron shape is formed in each servo band.

Next, by using an LTO8 full height drive, a data signal was written into data bands between the servo bands. At this time, the device was controlled such that the tape speed was 2.8 m/s, and the recording wavelength was 0.194 μm or 0.774 μm, and a value of resolution was acquired from an output ratio of respective wavelengths.

Example 2

A magnetic tape was acquired using the same method as that of Example 1 except that the magnetic powders included in the magnetic layer were changed from the barium ferrite magnetic powders of 2500 $nm^3$ to barium ferrite magnetic powders of 1600 $nm^3$, the aluminum oxide powders included in the magnetic layer were changed to powders having a primary particle diameter of 50 nm, the polyurethane resin UR8200 included in the underlayer was changed to a resin of which a glass transition temperature Tg was low, and the average thickness of the underlayer was changed to 0.90 μm.

Example 3

A magnetic tape was acquired using the same method as that of Example 1 except that the magnetic powders included in the magnetic layer were changed from the barium ferrite magnetic powders of 2500 $nm^3$ to barium ferrite magnetic powders of 1600 $nm^3$, the aluminum oxide powders included in the magnetic layer were changed to powders having a primary particle diameter of 50 nm, the polyurethane resin UR8200 included in the underlayer was changed to a resin of which a glass transition temperature Tg was low, and the average thickness of the underlayer was changed to 0.60 μm.

Example 4

A magnetic tape was acquired using the same method as that of Example 1 except that the magnetic powders included in the magnetic layer were changed from the barium ferrite magnetic powders of 2500 $nm^3$ to barium ferrite magnetic powders of 1600 $nm^3$, the aluminum oxide powders included in the magnetic layer were changed to powders having a primary particle diameter of 50 nm, and the average thickness of the underlayer was change to 1.09

μm by dispersing non-magnetic powders (needlelike iron oxide powders) in the underlayer (in other words, performing the sand mill mixing described above) and then adding a carbon black thereto.

Example 5

A magnetic tape was acquired using the same method as that of Example 1 except that the magnetic powders included in the magnetic layer were changed from the barium ferrite magnetic powders of 2500 nm$^3$ to barium ferrite magnetic powders of 1600 nm$^3$, the aluminum oxide powders included in the magnetic layer were changed to powders having a primary particle diameter of 50 nm, and the average thickness of the underlayer was change to 0.57 μm by dispersing non-magnetic powders (needlelike iron oxide powders) in the underlayer powder (in other words, performing the sand mill mixing described above) and then adding a carbon black thereto.

Example 6

A magnetic tape was acquired using the same method as that of Example 1 except that the magnetic powders included in the magnetic layer were changed from the barium ferrite magnetic powders of 2500 nm$^3$ to barium ferrite magnetic powders of 1600 nm$^3$, the aluminum oxide powders included in the magnetic layer were changed to powders having a primary particle diameter of 50 nm, a dispersion time (that is, a time of the sand mill mixing described above) in the underlayer was changed to 0.8 times, and the average thickness of the underlayer was changed to 1.16 μm.

Example 7

A magnetic tape was acquired using the same method as that of Example 1 except that the magnetic powders included in the magnetic layer were changed from the barium ferrite magnetic powders of 2500 nm$^3$ to barium ferrite magnetic powders of 1600 nm$^3$, the aluminum oxide powders included in the magnetic layer were changed to powders having a primary particle diameter of 50 nm, a dispersion time (that is, a time of the sand mill mixing described above) in the underlayer was changed to 0.8 times, and the average thickness of the underlayer was changed to 0.69 μm.

Example 8

A magnetic tape was acquired using the same method as that of Example 1 except that the magnetic powders included in the magnetic layer were changed from the barium ferrite magnetic powders of 2500 nm$^3$ to barium ferrite magnetic powders of 1600 nm$^3$, the aluminum oxide powders included in the magnetic layer were changed to powders having a primary particle diameter of 50 nm, the non-magnetic powders (needlelike iron oxide powders) included in the underlayer powder were changed to powders of which an average major axis length was 0.04 μm, and the average thickness of the underlayer was changed to 0.96 μm.

Example 9

A magnetic tape was acquired using the same method as that of Example 1 except that the magnetic powders included in the magnetic layer were changed from the barium ferrite magnetic powders of 2500 nm$^3$ to barium ferrite magnetic powders of 1600 nm$^3$, the aluminum oxide powders included in the magnetic layer were changed to powders having a primary particle diameter of 50 nm, the non-magnetic powders (needlelike iron oxide powders) included in the underlayer powder were changed to powders of which an average major axis length was 0.04 μm, and the average thickness of the underlayer was changed to 0.47 μm.

Example 10

A magnetic tape was acquired using the same method as that of Example 1 except that the timing of the curing process was changed from before calendering to after calendering, and the average thickness of the underlayer was changed to 1.22 μm.

Example 11

A magnetic tape was acquired using the same method as that of Example 1 except that the timing of the curing process was changed from before calendering to after calendering, the curing temperature was changed to 80° C., and the average thickness of the underlayer was changed to 1.31 μm.

Example 12

A magnetic tape was acquired using the same method as that of Example 1 except that the timing of the curing process was changed from before calendering to after calendering, the curing time was changed to 40 hours, and the average thickness of the underlayer was changed to 1.27 μm.

Example 13

A magnetic tape was acquired using the same method as that of Example 1 except that a dispersion time in the underlayer (that is, the time of sand mill mixing) was changed to 0.8 times, and the average thickness of the underlayer was changed to 1.23 μm.

Example 14

A magnetic tape was acquired using the same method as that of Example 1 except that the magnetic powders included in the magnetic layer were changed from the barium ferrite magnetic powders of 2500 nm$^3$ to barium ferrite magnetic powders of 1600 nm$^3$, the aluminum oxide powders included in the magnetic layer were changed to powders having a primary particle diameter of 50 nm, the curing process was additionally performed also after calendering, and the average thickness of the underlayer was changed to 1.21 μm.

Example 15

A magnetic tape was acquired using the same method as that of Example 1 except that the magnetic powders included in the magnetic layer were changed from the barium ferrite magnetic powders of 2500 nm$^3$ to barium ferrite magnetic powders of 1600 nm$^3$, the aluminum oxide powders included in the magnetic layer were changed to powders having a primary particle diameter of 50 nm, the curing process was additionally performed also after calendering, and the average thickness of the underlayer was changed to 1.25 μm.

Example 16

A magnetic tape was acquired using the same method as that of Example 1 except that the magnetic powders included in the magnetic layer were changed from the barium ferrite magnetic powders of 2500 $nm^3$ to barium ferrite magnetic powders of 1600 $nm^3$, the aluminum oxide powders included in the magnetic layer were changed to powders having a primary particle diameter of 50 nm, the average thickness of the magnetic layer was changed from 80 nm to 60 nm, the curing process was additionally performed also after calendering, and the average thickness of the underlayer was changed to 1.18 μm.

Comparative Example 1

A magnetic tape was acquired using the same method as that of Example 1 except that the curing process was additionally performed also after calendering, and the average thickness of the underlayer was changed to 1.25 μm.

Comparative Example 2

A magnetic tape was acquired using the same method as that of Example 1 except that the aluminum oxide powders included in the magnetic layer were changed to powders having a primary particle diameter of 50 nm, magnetic field orientation was not performed at the time of coating with a lower magnetic layer, the curing process was additionally performed also after calendering, and the average thickness of the underlayer was changed to 1.17 μm.

Comparative Example 3

A magnetic tape was acquired using the same method as that of Example 1 except that the magnetic powders included in the magnetic layer were changed from the barium ferrite magnetic powders of 2500 $nm^3$ to barium ferrite magnetic powders of 1600 $nm^3$, the aluminum oxide powders included in the magnetic layer were changed to powders having a primary particle diameter of 50 nm, magnetic field orientation was not performed at the time of coating with the magnetic layer, and the average thickness of the underlayer was changed to 1.27 μm.

Comparative Example 4

A magnetic tape was acquired using the same method as that of Example 1 except that a dispersion time in the underlayer (that is, the time of sand mill mixing) was changed to 0.8 times, the curing process was additionally performed also after calendering, and the average thickness of the underlayer was changed to 1.15 μm.

Comparative Example 5

A magnetic tape was acquired using the same method as that of Example 1 except that citric acid 2.5% by mass was added to the underlayer, the curing process was additionally performed also after calendering, and the average thickness of the underlayer was changed to 1.23 μm.

For the magnetic tapes of Examples 1 to 16 and Comparative Examples 1 to 5, the average thickness of the magnetic layer, the average thickness of the underlayer, the average thickness of the magnetic tape (the magnetic recording medium), a power spectrum density of the magnetic layer up to a spatial wavelength of 5 μm (Mag PSD (≤5 μm)), a height at each of area ratios of 10.00%, 20.00%, 30.00%, and 40.00% in the bearing curve, the core part level difference Rk, and the resolution were measured. These are acquired using the measurement methods described in one embodiment described above. Measurement results for the magnetic tapes of Examples 1 to 16 and Comparative Examples 1 to 5 are represented in the following Table 1.

As a reference example, for LTO8 manufactured by Fuji Film Ltd, a height and a core part level difference Rk for each of area ratios of 10.00%, 20.00%, 30.00%, and 40.00% in the bearing curve were measured. The measurement methods are the same as those of Examples and Comparative Examples described above. Measurement results for LTO8 of the reference example are also represented in the following Table 1. In the following Table 1, "–" represents that no measurement was performed.

TABLE 1

| | Magnetic layer average thickness (nm) | Underlayer average thickness (μm) | Magnetic tape average thickness (μm) | Mag PSD (≤5 μm) ($nm^3$) | Height of each area ratio of bearing curve(mm) | | | | Core part level difference Rk (nm) | Resolution (%) |
|---|---|---|---|---|---|---|---|---|---|---|
| | | | | | 10.00% | 20.00% | 30.00% | 40.00% | | |
| Reference example | — | — | — | — | 3.20 | 2.00 | 1.20 | 0.58 | 6.3 | — |
| Example 1 | 80 | 1.30 | 5.88 | 1.6 | 2.00 | 1.20 | — | — | 3.9 | 100.0 |
| Example 2 | 80 | 0.90 | 5.48 | 1.9 | 1.90 | 1.20 | 0.70 | 0.30 | 3.9 | 101.7 |
| Example 3 | 80 | 0.60 | 5.18 | 3.6 | 2.30 | 1.50 | 0.90 | 0.40 | 4.8 | 104.3 |
| Example 4 | 80 | 1.09 | 5.67 | 2.1 | 2.10 | 1.30 | 0.80 | 0.30 | 4.1 | 101.8 |
| Example 5 | 80 | 0.57 | 5.15 | 3.3 | 2.50 | 1.50 | 0.90 | 0.40 | 5.0 | 104.0 |
| Example 6 | 80 | 1.16 | 5.74 | 1.9 | 2.20 | 1.40 | 0.80 | 0.40 | 4.3 | 104.2 |
| Example 7 | 80 | 0.69 | 5.27 | 2.6 | 2.40 | 1.60 | 1.00 | 0.50 | 4.9 | 104.7 |
| Example 8 | 80 | 0.96 | 5.54 | 1.7 | 2.10 | 1.40 | 0.80 | 0.40 | 4.4 | 102.5 |
| Example 9 | 80 | 0.47 | 5.05 | 2.2 | 2.30 | 1.50 | 0.90 | 0.40 | 4.7 | 105.6 |
| Example 10 | 80 | 1.22 | 5.80 | 1.9 | 2.20 | 1.40 | — | — | 4.4 | 99.0 |
| Example 11 | 80 | 1.31 | 5.89 | 2.9 | 2.70 | 1.70 | — | — | 5.5 | 94.7 |
| Example 12 | 80 | 1.27 | 5.85 | 2.4 | 2.50 | 1.50 | — | — | 5.0 | 97.5 |
| Example 13 | 80 | 1.23 | 5.81 | 2.4 | 2.20 | 1.40 | — | — | 4.4 | 90.2 |
| Example 14 | 80 | 1.21 | 5.79 | 3.1 | 2.80 | 1.70 | — | — | 5.5 | 92.7 |
| Example 15 | 80 | 1.25 | 5.83 | 3.0 | 2.50 | 1.50 | — | — | 5.0 | 92.3 |
| Example 16 | 60 | 1.18 | 5.76 | 3.1 | 2.60 | 1.60 | — | — | 5.2 | 97.4 |
| Comparative example1 | 80 | 1.25 | 5.83 | 3.7 | 2.80 | 1.80 | — | — | 5.6 | 84.0 |
| Comparative example2 | 80 | 1.17 | 5.75 | 3.8 | 2.90 | 1.80 | — | — | 5.8 | 83.4 |

TABLE 1-continued

|  | Magnetic layer average thickness (nm) | Underlayer average thickness (μm) | Magnetic tape average thickness (μm) | Mag PSD (≤5 μm) (nm³) | Height of each area ratio of bearing curve(mm) | | | | Core part level difference Rk (nm) | Resolution (%) |
|---|---|---|---|---|---|---|---|---|---|---|
|  |  |  |  |  | 10.00% | 20.00% | 30.00% | 40.00% |  |  |
| Comparative example3 | 80 | 1.27 | 5.85 | 3.2 | 2.90 | 1.80 | — | — | 5.7 | 89.4 |
| Comparative example4 | 80 | 1.15 | 5.73 | 4.6 | 3.00 | 1.80 | — | — | 5.9 | 82.3 |
| Comparative example5 | 80 | 1.23 | 5.81 | 5.1 | 3.10 | 1.70 | — | — | 5.7 | 78.8 |

From Table 1, the following can be known.

When the results of Examples 1 to 16 and the results of Comparative Examples 1 to 5 are compared with each other, it can be known that the core part level difference Rk was 5.5 nm or less, and the resolution was 90% or more.

When the results of Examples 1 to 16 and the results of Comparative Examples 1 to 5 are compared with each other, it can be known that the lower the height at the area ratio of 10.00% in the bearing curve, the higher the resolution tends to be. By configuring the height at the area ratio of 10.00%, for example, to be 2.80 nm or less, preferably to be 2.50 nm or less, more preferably 2.30 nm or less, the resolution is considered to be able to be improved.

When the results of Examples 1 to 16 and results of Comparative Examples 1 to 5 are compared with each other, it is known that the height at the area ratio of 20.00% in the bearing curve is low as a whole in Examples 1 to 16. The height at the area ratio of 20.00%, for example, being 1.70 nm or less, and preferably being 1.60 μm or less is considered to contribute to improvement of the resolution.

When the results of Examples 1 to 16 and results of Comparative Examples 1 to 5 are compared with each other, it is known that the power spectrum density of the magnetic layer up to a spatial wavelength of 5 μm is low as a whole in Examples 1 to 16. The power spectrum density, for example, being 3.6 nm³ or less is considered to contribute to improvement of the resolution.

On the basis of contrast between Examples 2 and 3, contrast between Examples 4 and 5, contrast between Examples 6 and 7, and contrast between Examples 8 and 9, it can be known that the thinner the underlayer, the more the resolution is improved. It can be known that the average thickness of the underlayer, for example, being 1.35 μm or less and preferably 0.70 μm or less, the resolution can be improved.

Although the embodiment of the present technology and the examples have been described specifically, the present technology is not limited to the embodiment and the examples described above, and various modifications based on the technical idea of the present technology can be made.

For example, the configurations, the methods, the processes, the shapes, the materials, the numerical values, and the like exemplified in the embodiments and the examples described above are only examples, and as necessary, different configurations, methods, processes, shapes, materials, numerical values, and the like may be used. The chemical formulas of the compounds and the like are representatives, and a general name of the same compound is not limited to the listed valences and the like.

Also, the configurations, methods, steps, shapes, materials, numerical values, and the like of the embodiments and the examples described above can be combined with each other without departing from the gist of the present technique.

In this specification, a numerical range represented using "to" represents a range including numerical values represented before and after "to" as a minimum value and a maximum value. In the numerical ranges described in a stepwise manner in this specification, an upper limit value or a lower limit value of a numerical range in any step may be replaced with an upper limit value or a lower limit value of a numerical range in another step. Unless otherwise specified, the materials described in this specification can be used alone or in combination of two or more.

The present technology can also have the following configurations.

[1]
A magnetic recording medium of a tape form, including: a magnetic layer; and an underlayer, in which a core part level difference Rk is 5.5 nm or less in a bearing curve generated on the basis of height data of a magnetic layer-side surface acquired using an atomic force microscope, and an average thickness of the underlayer is 1.50 μm or less.

[2]
The magnetic recording medium described in [1], in which a height at an area ratio of 10.00% in the bearing curve is 2.80 nm or less.

[3]
The magnetic recording medium described in {1} or [2], in which a height at an area ratio of 20.00% in the bearing curve is 1.70 nm or less.

[4]
The magnetic recording medium described in any one of [1] to [3], in which a height at an area ratio of 30.00% in the bearing curve is 1.00 nm or less.

[5]
The magnetic recording medium described in any one of [1] to [4], in which a height at an area ratio of 40.00% in the bearing curve is 0.50 nm or less.

[6]
The magnetic recording medium described in any one of [1] to [5], in which the core part level difference Rk is 5.0 nm or less.

[7]
The magnetic recording medium described in any one of [1] to [6], in which the average thickness of the underlayer is 1.35 μm or less.

[8]
The magnetic recording medium described in any one of [1] to [7], in which the average thickness of the underlayer is 0.80 μm or less.

[9]
The magnetic recording medium described in any one of [1] to [8], in which an average thickness of the magnetic layer is 90 nm or less.

[10]
The magnetic recording medium described in any one of [1] to [9], in which an average thickness of the magnetic recording medium is 5.90 μm or less.

[11]

The magnetic recording medium described in one of [1] to [10], in which an average thickness of the magnetic recording medium is 5.30 μm or less.

[12]

The magnetic recording medium described in any one of [1] to [11], in which a power spectrum density of the magnetic layer up to a spatial wavelength of 5 μm is 3.6 nm$^3$ or less.

[13]

The magnetic recording medium described in any one of [1] to [12], in which the magnetic layer includes magnetic powders, and the magnetic powders contain hexagonal ferrite, ε-iron oxide, or Co-containing spinel ferrite.

[14]

A tape cartridge including: the magnetic recording medium of the tape form described in any one of [1] to [13]; a communication unit communicating with a recording and reproducing device; a storage unit; and a control unit storing information received from the recording and reproducing device through the communication unit in the storage unit, reading information from the storage unit in response to a request from the recording and reproducing device, and transmitting the information to the recording and reproducing device through the communication unit, in which the information includes adjustment information for adjusting a tension applied in a longitudinal direction of the magnetic recording medium.

REFERENCE SIGNS LIST

10 Magnetic recording medium
11 Base layer
12 Underlayer
13 Magnetic layer
14 Back layer

The invention claimed is:

1. A magnetic recording medium of a tape form, comprising:
    a magnetic layer; and
    an underlayer,
    wherein a core part level difference Rk is 5.5 nm or less in a bearing curve generated on the basis of height data of a magnetic layer-side surface acquired using an atomic force microscope, and
    wherein an average thickness of the underlayer is 1.50 μm or less.

2. The magnetic recording medium according to claim 1, wherein a height at an area ratio of 10.00% in the bearing curve is 2.80 nm or less.

3. The magnetic recording medium according to claim 1, wherein a height at an area ratio of 20.00% in the bearing curve is 1.70 nm or less.

4. The magnetic recording medium according to claim 1, wherein a height at an area ratio of 30.00% in the bearing curve is 1.00 nm or less.

5. The magnetic recording medium according to claim 1, wherein a height at an area ratio of 40.00% in the bearing curve is 0.50 nm or less.

6. The magnetic recording medium according to claim 1, wherein the core part level difference Rk is 5.0 nm or less.

7. The magnetic recording medium according to claim 1, wherein the average thickness of the underlayer is 1.35 μm or less.

8. The magnetic recording medium according to claim 1, wherein the average thickness of the underlayer is 0.80 μm or less.

9. The magnetic recording medium according to claim 1, wherein an average thickness of the magnetic layer is 90 nm or less.

10. The magnetic recording medium according to claim 1, wherein an average thickness of the magnetic recording medium is 5.90 μm or less.

11. The magnetic recording medium according to claim 1, wherein an average thickness of the magnetic recording medium is 5.30 μm or less.

12. The magnetic recording medium according to claim 1, wherein a power spectrum density of the magnetic layer up to a spatial wavelength of 5 μm is 3.6 nm$^3$ or less.

13. The magnetic recording medium according to claim 1, wherein the magnetic layer includes magnetic powders, and the magnetic powders contain hexagonal ferrite, ε-iron oxide, or Co-containing spinel ferrite.

14. A tape cartridge comprising:
    the magnetic recording medium of the tape form according to claim 1;
    a communication unit communicating with a recording and reproducing device;
    a storage unit; and
    a control unit storing information received from the recording and reproducing device through the communication unit in the storage unit, reading information from the storage unit in response to a request from the recording and reproducing device, and transmitting the information to the recording and reproducing device through the communication unit,
    wherein the information includes adjustment information for adjusting a tension applied in a longitudinal direction of the magnetic recording medium.

* * * * *